US012242469B2

(12) United States Patent
Datt et al.

(10) Patent No.: US 12,242,469 B2
(45) Date of Patent: Mar. 4, 2025

(54) AUTOMATIC GENERATION OF TRAINING AND TESTING DATA FOR MACHINE-LEARNING MODELS

(71) Applicant: Google LLC, Mountain View, CA (US)

(72) Inventors: Madhav Datt, Mountain View, CA (US); Sukriti Ramesh, Bengaluru (IN)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/082,811

(22) Filed: Dec. 16, 2022

(65) Prior Publication Data

US 2024/0134846 A1 Apr. 25, 2024
US 2024/0232177 A9 Jul. 11, 2024

(30) Foreign Application Priority Data

Oct. 21, 2022 (IN) .............................. 202221060441

(51) Int. Cl.
*G06F 16/242* (2019.01)
*G06N 20/00* (2019.01)

(52) U.S. Cl.
CPC ......... *G06F 16/2423* (2019.01); *G06N 20/00* (2019.01)

(58) Field of Classification Search
CPC ............................ G06F 16/2423; G06N 20/00
USPC .......................................................... 707/769
See application file for complete search history.

(56) References Cited

U.S. PATENT DOCUMENTS

2010/0177956 A1* 7/2010 Cooper ................. G06V 20/70
382/159
2017/0161614 A1* 6/2017 Mehta .................... G06N 20/00
2019/0087691 A1* 3/2019 Jelveh ..................... G06N 3/084
2019/0163666 A1* 5/2019 Cakmak ................... G06N 5/02
2019/0339416 A1* 11/2019 Elkabetz ................. G01W 1/02
2020/0193234 A1* 6/2020 Pai ........................ G06F 16/904

(Continued)

OTHER PUBLICATIONS

Abadi et al., "TensorFlow: Large-Scale Machine Learning on Heterogeneous Distributed Systems", arXiv:1603.04467v2, Mar. 16, 2016, 19 pages.

(Continued)

*Primary Examiner* — Boris Gorney
*Assistant Examiner* — Nicholas E Allen
(74) *Attorney, Agent, or Firm* — DORITY & MANNING P.A.

(57) ABSTRACT

Provided are computing systems, methods, and platforms for generating training and testing data for machine-learning models. The operations can include receiving signal extraction information that has instructions to query a data store. Additionally, the operations can include accessing, using Structured Query Language (SQL) code generated based on the signal extraction information, raw data from the data store. Moreover, the operations can include processing the raw data using signal configuration information to generate a plurality of signals. The signal configuration information can have instructions on how to generate the plurality of signals from the raw data. Furthermore, the operations can include joining, using SQL code, the plurality of signals with a first label source to generate training data and testing data. Subsequently, the operations can include processing the training data and the testing data to generate the input data. The input data being an ingestible for a machine-learning pipeline.

17 Claims, 8 Drawing Sheets

(56) References Cited

U.S. PATENT DOCUMENTS

| | | | | |
|---|---|---|---|---|
| 2020/0252318 A1* | 8/2020 | Kleider | ............. | H04B 17/3913 |
| 2021/0117447 A1* | 4/2021 | Li | ................... | G06F 18/24137 |
| 2021/0151140 A1* | 5/2021 | Bates | .................... | G06N 20/00 |
| 2021/0357959 A1* | 11/2021 | Cella | ................. | G06Q 10/0838 |
| 2022/0092349 A1* | 3/2022 | Yang | ...................... | G06V 20/56 |
| 2022/0100647 A1* | 3/2022 | Hamid | ............... | G06F 11/3684 |
| 2022/0180254 A1* | 6/2022 | Ahuja | ...................... | G06N 7/00 |
| 2022/0197246 A1* | 6/2022 | Cella | ......................... | G06T 7/70 |
| 2022/0269927 A1* | 8/2022 | Rice | ...................... | G06F 16/283 |
| 2022/0309407 A1* | 9/2022 | Ramirez | ............... | G06N 20/20 |
| 2022/0342988 A1* | 10/2022 | Brunza | ................. | G06N 3/044 |
| 2022/0360450 A1* | 11/2022 | Brandenburger | ... | H04L 63/0428 |
| 2022/0366220 A1* | 11/2022 | Roth | ....................... | G06N 3/08 |
| 2022/0392047 A1* | 12/2022 | Wheaton | ................ | G06V 10/40 |
| 2022/0398485 A1* | 12/2022 | Biswas | .................. | G06N 20/00 |
| 2022/0398524 A1* | 12/2022 | Abdullah | ............. | G06F 40/226 |

OTHER PUBLICATIONS

Nunes et al., "TensorX: Extensible API for Neural Network Model Design and Deployment", arXiv:2012.14539v2, Jan. 2, 2021, 7 pages.

TensorFlow, "The Tensor Flow User Guide", https://www.tensorflow.org/tfx/guide, retrieved on Jan. 24, 2023, 13 pages.

* cited by examiner

AUTOMATIC GENERATION OF TRAINING AND TESTING DATA FOR MACHINE-LEARNING MODELS

FIELD

The present disclosure relates generally to machine learning. More particularly, the present disclosure relates to computing systems, methods, and platforms that automatically generates training and testing datasets for machine learning (ML) models.

BACKGROUND

Machine learning is a field of computer science that includes the building and training (e.g., via application of one or more learning algorithms) of analytical models that are capable of making useful predictions or inferences on the basis of input data. Machine learning is based on the idea that systems can learn from data, identify patterns, and make decisions with minimal human intervention.

Various machine learning libraries exist which assist software developers in generating and deploying machine learning models. In particular, in computer science, a library is a collection of non-volatile resources used by computer programs, often for software development. These may include configuration data, documentation, help data, message templates, pre-written code and subroutines, classes, values, or type specifications.

A software developer or other user or individual can interact with a software library to build and deploy a machine learning pipeline. A machine learning pipeline can include computer-readable code that automates the workflow it takes to produce and/or deploy a machine learning model. Machine learning pipelines can include multiple sequential steps that do everything from data extraction and preprocessing to model training and deployment.

However, building and/or deploying a machine learning pipeline can be a challenging and time-consuming task. In particular, while certain existing machine learning libraries or other tools provide powerful components that span the entire machine learning workflow, these resources are often overly complex and may be accessible only to individuals or teams with a high level of infrastructure sophistication and engineering resources to invest into data wrangling, pipeline configuration & architecture, and modeling decisions.

While for certain sophisticated users this level of complexity may be workable, a large number of software developers or other users do not have the level of expertise to easily use such complicated resources. Further, even for sophisticated users, designing, training, and deploying a machine learning model with an associated deployment pipeline can require a significant amount of time, such as weeks to months. Therefore, improved systems which facilitate the training and development of machine learning models are desired.

SUMMARY

Aspects and advantages of embodiments of the present disclosure will be set forth in part in the following description, or can be learned from the description, or can be learned through practice of the embodiments.

According to an example embodiment, a computer-implemented method is described. The method can include receiving signal extraction information that has instructions to query a data store. Additionally, the method can include accessing, using Structured Query Language (SQL) code generated based on the signal extraction information, raw data from the data store. Moreover, the method can include processing the raw data using signal configuration information to generate a plurality of signals. The signal configuration information can have instructions on how to generate the plurality of signals from the raw data. Furthermore, the method can include joining, using SQL code, the plurality of signals with a first label source to generate a training dataset and a testing dataset. Subsequently, the method can include processing the training dataset and the testing dataset to generate the input data. The input data being an ingestible file (e.g., a TFX ingestible file) for a machine-learning pipeline.

In some instances, the method can further include joining, using SQL code, the plurality of signals and the first label source with a second label source to generate the training dataset and the testing dataset. The first label source can be a different system than the second label source. For example, the first label source can be an annotated dataset that has human-generated labels, and the second label source can be a data source that has feedback information based on user interaction. Additionally, the first label source can be associated with a first sample weight, and the second label source can be associated with a second sample weight. Moreover, the joining of the plurality of signals and the first label source with the second label source can be further based on the first sample weight and the second sample weight. Furthermore, the first sample weight can be based on a confidence level associated with the first label source, and the second sample weight can be based on a different confidence level associated with the second label source.

In some instances, the method can further include receiving, from a user input, the signal configuration information that has instructions to generate the plurality of signals from the raw data. For example, the user input can include custom code to be executed using an on-the-fly operation. The custom code can define a first signal and how to generate the first signal using the raw data.

In some instances, the first signal can be an inferred signal that was not generated in a prior iteration of the plurality of signals, and the inferred signal can have been directly generated from the raw data. Additionally, the method can further include determining that the inferred signal is a new signal because the inferred signal was not previously generated in the prior iteration of the plurality of signals. Moreover, the method can include determining to omit a backfilling operation of the new signal because the inferred signal can have been directly generated from the raw data.

In some instances, the first signal can be a base signal that was not generated in a prior iteration of the plurality of signals, and the base signal can be derived by processing a plurality of inputs obtained from the raw data. Additionally, the method can further include backfilling the base signal using an on-the-fly operation, where the on-the-fly operation prevents a full-fledged backfill operation.

In some instances, the data store can include a first data source and a second data source. Additionally, the signal extraction information can include instructions to query the first data source and the second data source. The first data source can be a different type than the second data source. For example, the first data source can be a column in a first dataset and the second data source can be a human-generated label in a second dataset.

In some instances, the method can further include performing, based on a custom request, a custom-split of the training dataset and the testing dataset when generating the training dataset and the testing dataset. For example, the custom request can be a date reference. The training dataset can be associated with data prior to the date reference and the testing dataset can be associated with data after the date reference. Additionally, the machine-learning model can be trained on non-independent and identically distributed (IID) data requiring a custom-split of the training dataset and the testing dataset.

In some instances, the method can further include transmitting an alert when an error occurs during the generating of the plurality of signals.

In some instances, the method can further include transmitting an alert when an error occurs during the generating of the training dataset or the testing dataset.

In some instances, the training dataset is utilized during the training of the machine-learning model, and the testing dataset is utilized during the validation testing of the machine-learning model.

In some instances, the plurality of signals can be stored in a table pointing to a file dump containing all signals utilized by the machine-learning model. The table can be configured, using a table alias generator, to point to the file dump that is current.

According to another example embodiment, a computing system is described. The computer system can receive signal extraction information that has instructions to query a data store. Additionally, the computer system can access, using Structured Query Language (SQL) code generated based on the signal extraction information, raw data from the data store. Moreover, the computer system can process the raw data using signal configuration information to generate a plurality of signals. The signal configuration information can have instructions on how to generate the plurality of signals from the raw data. Furthermore, the computer system can join, using SQL code, the plurality of signals with a first label source to generate a training dataset and a testing dataset. Subsequently, the computer system can process the training dataset and the testing dataset to generate the input data. The input data being an ingestible file (e.g., a TFX ingestible file) for a machine-learning pipeline.

According to another example embodiment, one or more non-transitory computer-readable media is described. The media can collectively store a machine-learned model, wherein the candidate machine-learned model has been learned by performance of operations. The operations can include receiving signal extraction information that has instructions to query a data store; accessing, using Structured Query Language (SQL) code generated based on the signal extraction information, raw data from the data store; processing the raw data using signal configuration information to generate a plurality of signals, the signal configuration information having instructions on how to generate the plurality of signals from the raw data; joining, using SQL code, the plurality of signals with a first label source to generate a training dataset and a testing dataset; and processing the training dataset and the testing dataset to generate the input data. The input data being an ingestible file (e.g., a TFX ingestible file) for a machine-learning pipeline.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of implementations directed to one of ordinary skill in the art is set forth in the specification, which makes reference to the appended figures, in which.

Figure 1:
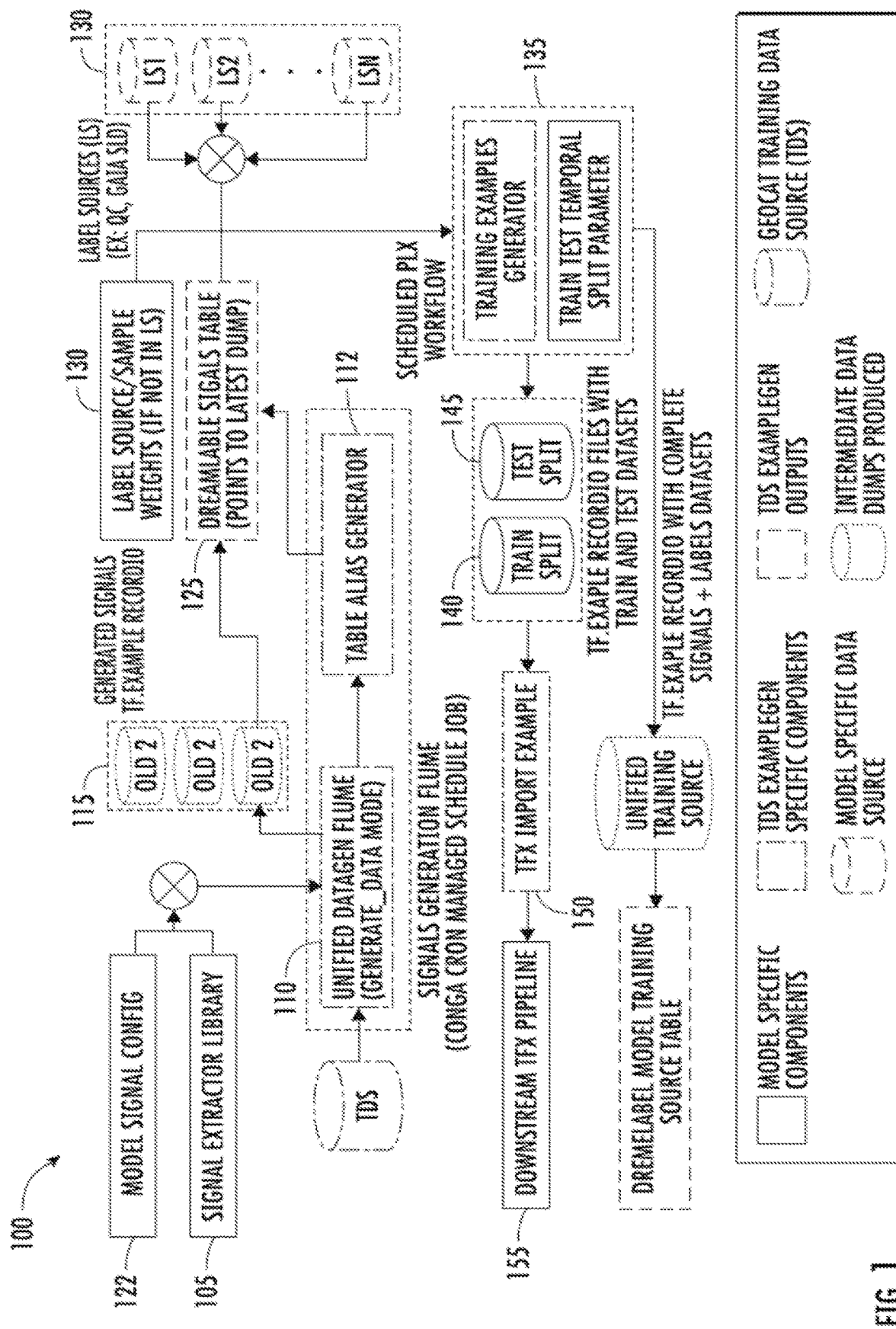
FIG. 1 illustrates a block diagram of an example system for generating training and testing data for a machine-learning model, according to example implementations of the present disclosure.

Reference numerals that are repeated across plural figures are intended to identify the same features in various implementations.

DETAILED DESCRIPTION

Overview

Machine learning developers desire an improvement in the training and performance of a machine learning model by enabling ease of use by automating the generation of training datasets and testing datasets. The process of generating training and testing datasets can be part of the model training process. However, in many applications the generation of training and testing datasets depends upon a variety of factors, making it difficult to perform in an automated fashion. Instead, many applications include the use of manual processes that may result in increased cost (e.g., in time, computational resources, quality control resources) for generating the training and testing datasets. Additionally, automating the generation of training and testing datasets can improve the user experience by decreasing the number of user interactions.

Generally, the present disclosure is directed to computing systems, methods, and platforms for an automated, robust, and highly flexible end-to-end pipeline to generate training and test datasets for machine-learning (ML) models. In some instances, the techniques described herein can be performed by an automated system, having an ExampleGen pipeline, to enable signal generation, combine multiple weighted label sources, and ingest data into production TensorFlow Extended (TFX) pipelines. The ExampleGen pipeline component can ingest data into TFX pipelines. For example, the ExampleGen pipeline component can access external files or services to generate examples which will be read by other TFX components.

In some instances, the techniques described herein can be utilized by different TFX-based ML models for fraud defense and quality control. The techniques enable raw and/or unprocessed structured query language (SQL) data tables to be processed and ingested in order to train and test datasets.

In conventional systems, generating training and test data for ML models can be a manual process which involves significant human interactions and can rely on multiple independent jobs, standalone scripts, and manipulations on CSV datasets. Conventional system can have a manual setup where it may require many weeks to generate training and test data for each retraining cycle of the ML model. Additionally, the manual setup also significantly reduces experimentation velocity due to the involvement of human interaction during the execution of the evaluative methods of the ML model. Moreover, in conventional systems, data generation for machine-learning models has been identified as a key area involving technical debt with a repeated cost a plurality of software engineers per year.

In contrast, the embodiments described herein can reduce or eliminate the need for recurring software engineers' cost for such ML models. Furthermore, with the techniques described herein, the system can be trained on-the-fly in order to have zero down time when generating (e.g., obtaining) train and test datasets. For example, the system described herein can include an ExampleGen pipeline to generate train and test datasets for a plurality of classifier experiments.

Machine learning models that are built on TFX may need to have a mechanism to be able to input data into the TFX pipeline. Conventional methods can enable models to input data, but conventional methods may be limited in the type of data that can be inputted into the TFX pipeline. In contrast, the automated system described herein can define test train splits and feed in data from different sources into the TFX pipeline. The automated system can feed the input data (e.g., training and test data) into the TFX pipeline so that the input data can be utilized downstream by the other TFX components. For example, the automated system can be outside of the TFX pipeline, and feed in the input data to a TFX pipeline via an ExampleGen component. The automated system can be entirely automated without a need for human input or oversight. The automated system can enable a robust and flexible end-to-end pipeline that can generate, train, and test datasets. In some instances, the automated system can be implemented with any SQL accessible data source. For example, the automated system can function with any data store that utilizes SQL queries.

The embodiments described herein provide a variety of technical benefits, including reducing the memory requirement or other computational costs for manually generating the training and testing datasets for a machine learning model. These benefits can be realized in an online pipeline-style environment (e.g., TensorFlow or TFX) where inputs are automatically generated by the system without human input which can be expensive with respect to memory or other computational costs. Additionally, the alert system enables the process of generating the datasets to be halted in real-time to prevent unnecessary processing (e.g., reducing computing resources) when an error has occurred in the process.

Additionally, the proposed system reduces time and effort for entry-level users of a machine learning model who are not familiar with the internal systems or infrastructure of the machine learning model. Software developers who are not familiar with the machine learning model can use the proposed system to experiment with a new signal for the machine learning model without interacting directly with the internal systems or infrastructure of the machine learning model.

The techniques described herein reduce the need for the manual intervention by a software developer or other user that is necessary in order to operate the proposed system. For example, in some implementations, the only inputs required from a software developer are to provide the initial inputs of the training dataset and analyze the final results produced by the system. Additionally, the system can be packaged into a custom TensorFlow Extended (TFX) component that can be added to a TFX machine learning pipeline. For example, the custom TFX component can use various relevant data slices from other TFX components as input and generate and export a trained candidate machine learning model. The output produced by the custom TFX component can then be used by downstream components of the TFX machine learning pipeline.

According to some embodiments, the automated system can combine a wide range of arbitrary data sources that can work with SQL for labels. The automated system can have a pipeline that is designed with the key features in order to perform the techniques described herein. In the past, this has been a challenge, because data labels can be received from ML models from multiple different sources. For example, in a simple case, the arbitrary data source can be a column in a data set. In a more complicated example, the arbitrary data source can be coming from human operators (e.g., users that annotate dataset to provide labels). In another example, the arbitrary data source can be received from a different system entirely. In another example, the arbitrary data source can be received from a feedback loop based on user interaction (e.g., the item receives a positive label when a user clicks on an item). The techniques described herein allows the system to combine and support arbitrary data sources that can be queried with SQL.

The automated system can combine the arbitrary data sources and their associated sample weights. The automated system can support different sample weights when combining the different data sources, which can be crucial in problem spaces where the different classes are not balanced. In some instances, different data sources may have different levels of confidence. For example, the automated system may determine or receive different levels of confidence associated with the different data sources and determine a sample weight associated with the data source based on the confidence level. For example, the different data sources can be provided from different content providers, and the level of confidence can be determined based on the content provider. The automated system can modify a first data source based on the sample weight associated with the first data source in order to incorporate the sample weight during the training of the ML model.

Additionally, the automated system minimizes the need to backfill a dataset when a new signal is added to the dataset. For example, when a new column is added, a temporal database may need to be backfilled with historic information for the new column. In a conventional system, the system performs a full-fledged backfill operation by resending and processing the entire dataset through the system to generate information for the new column based on past information. Performing a full-fledged backfill operation is computationally expensive because the dataset can be large and may span multiple years. In contrast, the automated system can perform the backfill operation by automatically generating data for the new column on the fly, instead of having to perform a full-fledged backfill operation. By automatically generating data on the fly, the automated system does not need to perform a full-fledged backfill every time a new signal is added. As a result, the automated system can save a lot of effort and time, given that the full-fledged backfill operation is a computationally expensive operation.

Moreover, the automated system can improve model experiment velocity by supporting experimentation with new signals, label sources and other data outside of the TFX pipeline. Given that the automated system is easily configurable by a user, model experiments can be performed faster than conventional systems. For example, additional columns and features can be easily added to the dataset, which improves model experiment velocity by quickly performing experiments on the model.

Furthermore, the automated system can provide for custom test-train splits of the data. This can be important for models trained on non-independent and identically distributed (IID) data where traditional hash bucket based splits are not applicable. In some instances, since abuse trends are temporal (e.g., time-based), fraud model trains and test sets use date-range based splits. Conventional methods may only support random split (e.g., 80/20 split), which results in the dataset being split based on the non-customizable random split (e.g., 80/20 split). A random split may not for problems where the data is non-IID (e.g., the data not being random or independently distributed). Given that many problems have data that are not IID, the system may require a custom test-train splits in order to perform well. The automated system described herein is plug-and-play and allows for custom test-train splits of the data. The custom split can be based on a logic associated with the data. For example, the automated system supports a temporal split (e.g., split based on time). In this example, the automated system can receive a time reference (e.g., specific cutoff time), and the system can split the data so the data associated prior to the time reference can be training data to be used during the training of the model, and the data associated after the time reference can be validation data to be used during the validation testing of the model.

According to some embodiments, the automated system can generate (e.g., produce) a plurality of different outputs, such as, but not limited to, a signal dump, model training source, and TFX ingestible files.

With regards to the signals dump, for example, the automated can generate a table pointing to a file dump (e.g., recordIO file) of tf.Examples containing all signals used by the model for each sample present in the data. The table can be configured such that the table alias automatically always points to the latest file dump. The automated system can produce multiple sources of data that can be queried by SQL. The multiple sources of data can include data having all the different signals for all of the datasets. The multiple sources of data can include running code on top of the raw data. For example, a type of code (e.g., C++ libraries) can be executed with the raw data to generate (e.g., produce) the dataset. In some instances, the dataset generation can involve processing the data, preprocessing the data, aggregations, and/or running logic on top of the data. Examples of logic being executed on the data can include logic associated with determining whether it is a working day based on two columns of the data that store the date and the day of the week. Any type of custom logic that can be added in code can be added as a layer on top of the raw data, and that can be executed on the fly as you generate your dataset based on the raw data. In contrast, prior conventional systems may have not been able to execute code on raw data as the dataset is being generated. As a result, the automated system is able to generate datasets on-the-fly based on a custom code (e.g., logic).

Additionally, the automated system can generate model training sources. The model training source can include some or all of the test training data along with labels, sample weights, and other data objects. As previously described, the automated system can combine arbitrary data sources to generate a model training source. For example, the model training source can include a table pointing to a file dump (e.g., recordIO file) tf.Examples containing training samples (e.g., signals, labels, sample weights) for all samples for which labels were available within label sources for the model. The table can be configured such that the table alias automatically always points to the latest dump.

Moreover, the automated system can generate TFX ingestible files containing train and test datasets based on custom test-train split of the data. In some instances, the TFX ingestible files can be inputted to the TFX pipeline directly via a stock ImportExample component. The files can be recordIO files containing train and test sets from the model training source based on temporal ranges (e.g., in days) set by model owners. For example, the automated system can provide recordIO files or TFX ingestible data that can be inputted into a TFX pipeline to be utilized for model training. The TFX ingestible data can be compatible with TFX files so that it can be inputted into the TFX pipelines.

Example Use Cases

According to some embodiments, the system can include an ExampleGen component. The ExampleGen component can generate data for ML models that use an SQL database. For example, the ExampleGen component can be utilized for SQL databases that use Tabular Data Stream (TDS) as the data store. TDS can include an application layer protocol, which is utilized to transfer data between a database server and a client.

According to some embodiments, the system, including the ExampleGen component, can support a plurality of machine-learning (ML) model use cases. The plurality of use cases can be based on the input data generated by the system. In some instances, the system can support, but not limited to, re-thresholding of ML models, retraining of ML models, adding new signals to an existing model, building a new model, and monitoring and alerting use cases.

With regards to the re-thresholding use case, the ExampleGen component can include model specific workflows (e.g., Plx workflows) that are customized to include any thresholding fields based on a joining operation with any data source (e.g., SQL data source). For example, the thresholding field can be fraud approval cost class. As a result, the most recent test-set data (e.g., tf.Examples data) generated via the ExampleGen component can then be sent to an auto-thresholding component or custom thresholding collaboration to obtain new thresholds for the model.

In some instances, a model can drift over time due to an event (e.g., data environment changing, fundamental changes in the stream of information on which the model is operating). Therefore, when the event occurs, the system may need to modify a threshold value of the model. For example, with a binary classification model having a threshold value of 0.90, the model can determine that an output value greater than 0.9 is labeled as 1 (e.g., yes), and anything less than 0.9 is labeled as 0 (e.g., no). However, when the event occurs, the system may want to rethreshold the model and change the threshold value from 0.90 to 0.95. In such a situation, the system can train the model on the fly by modifying the code layer of the data (e.g., by adding a thresholding field to a thresholding logic in the code) and executing the code in real-time. As a result, once the thresholding logic is added to the code layer of the data, and the pipeline is run, the threshold value can be automatically updated for the data on the fly.

With regards to the retraining of ML models use case, in some instances, the train and test datasets generated from ExampleGen component can be directly ingested into TFX pipelines via the ImportExample component. Additionally, the ImportExample component can be configured to automatically trigger model retraining each time new data is available. For example, the generated data can also be used with a binary classification (e.g., train_opt binary) to retrain different ML models.

With regards to the addition of new signals to an existing model use case, new experimental signals can be added to the train and test datasets via a join operation (e.g., Plx joins) with the model training source table generated by the ExampleGen component. The join operation can occur without requiring changes to the underlying signal generation code, thus supporting rapid experimentation around signal discovery and feature engineering. In some instances, new signals added to the model configuration and associated SignalExtractor library can be automatically picked up in the subsequent run by the ExampleGen component.

With regards to building of a new model use case, the ExampleGen component can be used to generate the most-recent training and test data for new models. In some instances, the system can leverage the same SignalExtractor library used by the model on the online path. The new models can be for experimental use cases, local use cases, and production (e.g., prod) use cases. Thus, the system can simplify exploring new classifier families and ML frameworks, but also supporting the productization of a model on TFX.

With regards to the monitoring and alerting use case, the system allows for more robust and comprehensive monitoring and alerting. In some instances, the monitoring dashboards can directly depend on the model training source table generated by ExampleGen component instead of relying on multiple different label and signal sources to compute and track performance metrics, signal drift, and so on.

In some instances, the system can be configured to transmit an alert when output from one of the components in the system has an error, a process fails to execute, a job (e.g., from the signal generation component) is unable to successfully start, a workflow (e.g., from scheduled workflow component) for training example generation fails. The system can be configured such that alerts triggered lead to a bug being created and assigned to a user (e.g., the model owner developer), or an email sent to a user (e.g., relevant mailing list).

With reference now to the Figures, example implementations of the present disclosure will be discussed in greater detail.

Example Training and Testing Datasets Generation

FIG. 1 depicts a block diagram of an example system 100 according to example implementations of the present disclosure.

The system 100 can include a data source 105. For example, the data source 105 can be an SQL database (e.g., TDS). The data source 105 can be input data to the Signal Generation component 110. The Signal Generation component 110 can be a pipeline that can generate signals based on the data received from the data source 105. The Signal Generation component 110 can generate signals periodically (e.g., every hour, every day, every week) and stored the generated signals in a signal database 115.

Additionally, the Signal Generation component 110 can receive data from a signal extractor library 120. The signal extractor library 120 can provide configuration information regarding how to extract signal(s) from the data source. For example, in the rethresholding use case example, the threshold value stored in the signal extractor library can be updated based on a new threshold value (e.g., increasing the value from 0.9 to 0.95). The signal extractor library 120 can edit the threshold logic to modify the threshold value from 0.9 to 0.95. Therefore, when a new set of signals are generated based on the data source 105, the system can automatically update all that logic and/or update a column that has been affected by the new logic. In this example, the new column can be the result of executing the threshold logic on the data received from the data store. According to some embodiments, the model signals configuration component 122 can indicate what signals to extract from the signal generation component 110 and store as generated signal(s) in the signal database 115.

In some instances, the Signal Generation component 110 can classify signals used by a model into two broad categories: base signals and inferred signals. Base signals can be the signals that may require new data to be logged into the data source 105. Inferred signals can be signals obtained from: feature engineering; performing a remote procedure call (RPC) call to an upstream model; or running a code library on top of data that is already logged in the data store 105.

The Signal Generation component 110 can include a generate data mode in the pipeline to leverage a portion of the pipeline to extract signals (e.g., using model's SignalsExtractor library) from data logged in the data store 105 and dump the data in a tf.Example recordIO file. The generate data mode can enable the system to run and dump signal data, in a model-type agnostic manner, only depending on a list of signals provided in a model signals configuration component 122. The Signal Generation component 110 can be scheduled to run periodically (e.g., daily, weekly) as specified by a model owner.

With the ExampleGen pipeline, backfills can be needed when new base signals are added to the model, but backfills may not be needed when new inferred signals are added, because inferred signals are directly generated from logged data by the pipeline via the model specific SignalExtractor. By classifying the data as either base signals or inferred signals, the system reduces the barrier around experimenting with feature engineering ideas and adding new signals.

In some instances, the Signal Generation component 110 can include a table alias generator 112. The table alias generator 112 can include an asynchronous downstream reader. For example, given that the schedule workflow component 135 can asynchronously read from the signal table 125 generated by the Signal Generation component 110, there can be a possibility that the schedule workflow component 135 reads from a yet incomplete dump (e.g., from the signal table 125). For example, an incomplete dump can occur if the Signal Generation component 110 is still running and a partial dump can occur if the Signal Generation component 110 run failed before finishing. This can lead to data consistency issues in the training and test sets produced by the ExampleGen pipeline. To prevent such situations from occurring, the table alias generator 112 can generate a TableAlias pointing to the recordIO dump of tf.Examples produced by the Signal Generation component 110 once the run has been successfully completed. Using this mechanism, the signals table 125 can point to the latest complete signals dump.

The signal database 115 can include the entire set of signals that are generated based on the data extracted from the data store 105 at a particular time event (e.g., at a particular snapshot in time). The signal database 115 can include base signals and inferred signals. The signal database 115 can include prior iterations of generated signals at previous time events. The number (e.g., 10, 20, 30) of prior iterations of generated signals can be configurable by a user or by the system based on a data retention policy.

In addition, the workflow splits the above mentioned recordIO dump into temporally sequential non-overlapping train and test datasets, based on the test and train split sizes (in days) specified by the model owner, and outputs separate tf.Example recordIO files containing the latest test and train sets that can be ingested into TFX pipelines.

The signal database 115 can output the most recent generated signals to a signals table 125. The signals table 125 can point to the latest dump for the generated signals. The output of the signal database 115 and/or signals table 125 can be transmitted to the scheduled workflow component 135 (e.g., scheduled Plx workflow component). Additionally, the scheduled workflow component 135 can receive label sources 130 from label database(s). A label source can be a table that has annotations from a human operator that, for example, annotates data from a different system. The plurality of label sources 130 with their associated weights can be combined with the signals table 125 and inputted to the scheduled workflow component 135.

In some instances, the signal database 115 generated by the Signal Generation component 110 can be accessed via its table pointer from the signals table 125. The system 100 is designed to enable an automatically triggered schedule workflow component 135 to select samples, labels, and other relevant evaluation information (e.g., sensitivity classes, sample weights) present in model specific label sources and join them with signal database 115. Given that these joins can be performed via SQL code, an arbitrary number of label sources (e.g., fraud quality control) and heuristics (e.g., based on information in sources accessible to the model) can be used to obtain model training labels, and scaling weights at both the label source and individual sample levels. For example, the schedule workflow component 135 can generate a model training source table of tf.Examples containing all signals, labels, and other relevant evaluation information for samples for which labels are available in label sources.

The schedule workflow component 135 can be part of SQL pipeline that can generate a custom-split of the training data 140 and/or the testing data 145. The custom-split, such as a temporal split, can be based on a custom logic specified by a custom logic layer. For example, the training data 140 can include data prior to a specific time period, and the testing data 145 can include data after the specific time period. In some instances, the training data 140 and/or the testing data 145 can be tf.Example recordIO files. The schedule workflow component 135 can split datasets into test and train sets based on specific features (e.g., as timestamp) to enable the test and train set to be temporally non-overlapping. For example, the system 100 can use the pre-split and pre-materialized train and test tf.Example recordIO files obtained from the schedule workflow component 135 and ingest it into TFX pipeline 155 using a TFX ImportExample component 150. The TFX ImportExample component can be an out-of-the-box ImportExample ExampleGen binary. The schedule workflow component 135 can also shuffle the data within each split.

Subsequently, the training data 140 and/or the testing data 145 can be inputted into a TFX ImportExample component 150 to be utilized downstream in a TFX pipeline 155. For example, the different use cases (e.g., model retraining) can be performed in the TFX pipeline 155.

Example Origination Machine Learning Pipeline

Figure 2A:
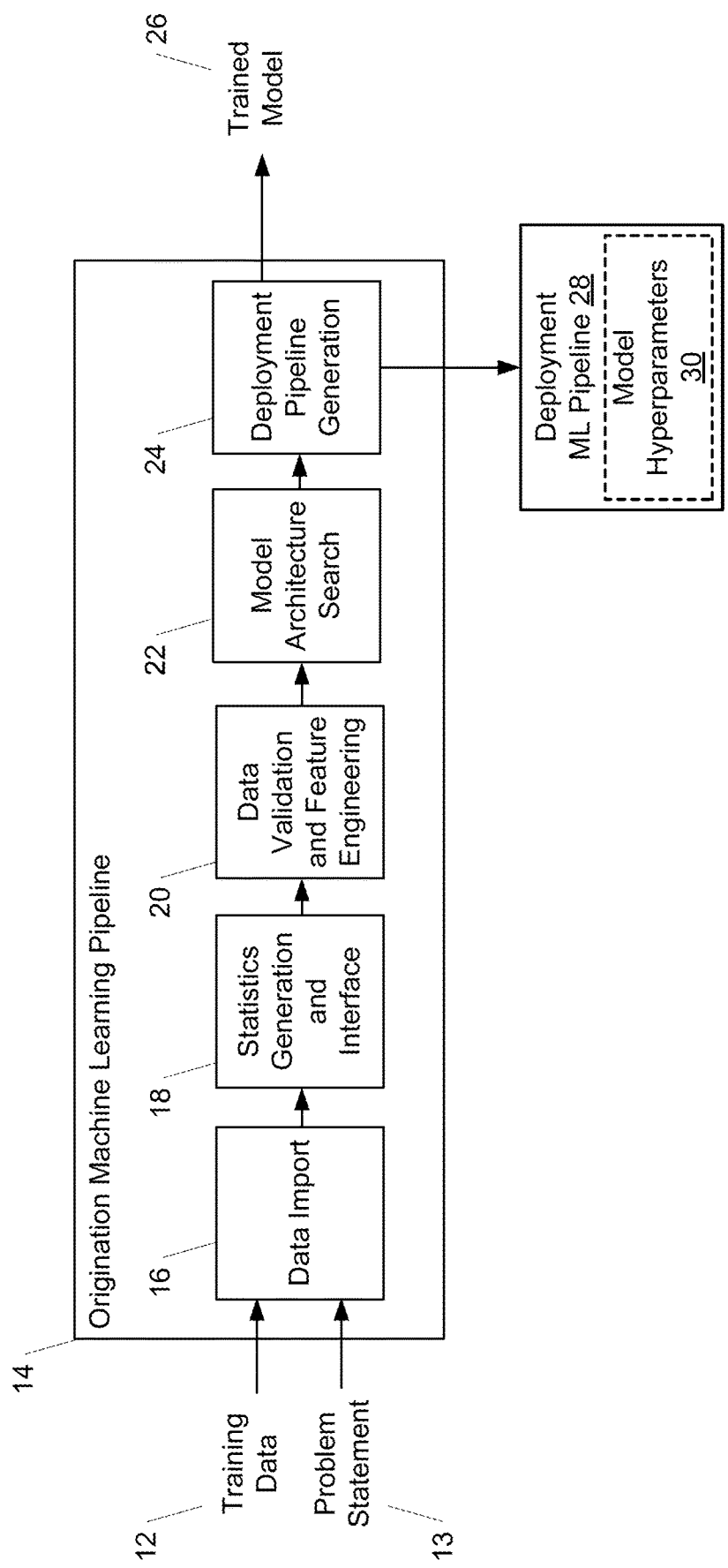
FIG. 2A depicts a block diagram of an example origination machine learning pipeline according to example implementations of the present disclosure.

FIG. 2A depicts an example origination ML pipeline 14 (e.g., TFX pipeline 155 in FIG. 1). The example origination ML pipeline 14 illustrated in FIG. 2A can be configured to receive training data 12 (e.g., training data 140, input data) and, optionally, a problem statement 13 from a user. Execution of origination ML pipeline 14 can result in generation and exportation of a trained model 26 and a deployment ML pipeline 28 that is configured to enable deployment of the trained model 26. In at least one implementation, execution of origination ML pipeline 14 can result in generation and exportation of trained model 26, deployment ML pipeline 28, and/or model hyperparameters 30 that can correspond to and/or constitute a subset of hyperparameters of deployment ML pipeline 28 and/or trained model 26. In one or more implementations, origination ML pipeline 14 and deployment ML pipeline 28 can each include computer-readable code that automates the workflow it takes to produce and/or run trained model 26.

More particularly, a user can refer to any individual, organization, or computing system operating on behalf of an individual or organization. Example users of the proposed systems can include engineers, analysts, product managers, researchers, platform developers, etc. Users can interact with the proposed system via a dedicated user interface and/or via an API with defined API calls for certain services. In some implementations, a user can interact with origination ML pipeline 14 via a graphical user interface (GUI) and/or via a programmatic API. For example, in one implementation, an ML platform that provides ML services for various users can request and receive trained model 26, deployment ML pipeline 28 (e.g., including model hyperparameters 30), and/or any of the pipeline generation services described herein from origination ML pipeline 14 via a programmatic API.

In this example implementation, origination ML pipeline 14 can receive (e.g., import) training data 12 and, optionally, problem statement 13 from such an ML platform user via the programmatic API, where training data 12 can be associated with the ML platform user and/or one or more individual users associated with the ML platform user. For example, the system 100 in FIG. 1 can generate training data 12 (e.g., training data 140 in FIG. 1) that can be ingested it into the ML pipeline 14 (e.g., TFX pipeline 155 in FIG. 1) using an import component (e.g., a TFX ImportExample component 150 in FIG. 1).

In this example implementation, origination ML pipeline 14 can further export trained model 26 and/or deployment ML pipeline 28 (e.g., including model hyperparameters 30) to such an ML platform user via the programmatic API, where origination ML pipeline 14 can export trained model 26 and/or deployment ML pipeline 28 (e.g., including model hyperparameters 30) for deployment of trained model 26 with (e.g., using) deployment ML pipeline 28.

In one example, the system (e.g., system 100) can automatically generate and supply a set of training data 12 (e.g., which may be structured as data for each of a number of features for each of a number of examples). For instance, training data 12 can include and/or constitute a structured training dataset having data associated with a number of labels. The user can select one of the features as a label (e.g., the feature to be predicted by trained model 26), which may start the search for the best machine learning model. In some implementations, the user may also specify other "advanced" settings from the UI, such as: excluding features, changing feature types, details of the ML task (e.g., corresponding to a problem statement), and details of the search constraints (e.g., corresponding to parameters of an optimization domain associated with a model architecture search). As referenced herein, an "optimization domain" can refer to a list of parameters, their domain (e.g., valid values), and the relationship between them (e.g., one parameter may be conditioned on another one) for an underlying parameterized model.

In some implementations, origination ML pipeline 14 described with reference to FIG. 2A can include and/or otherwise be associated with one or more components that can perform one or more operations associated with data import 16, statistics generation and interface 18, data validation and feature engineering 20, and/or model architecture search 22. In one or more implementations of the present disclosure, such one or more components that can be included in and/or otherwise associated with origination ML pipeline 14 can leverage one or more capabilities of one or more libraries that can be accessed by and/or can provide the base functionality of such one or more components as described below.

Figure 2B:
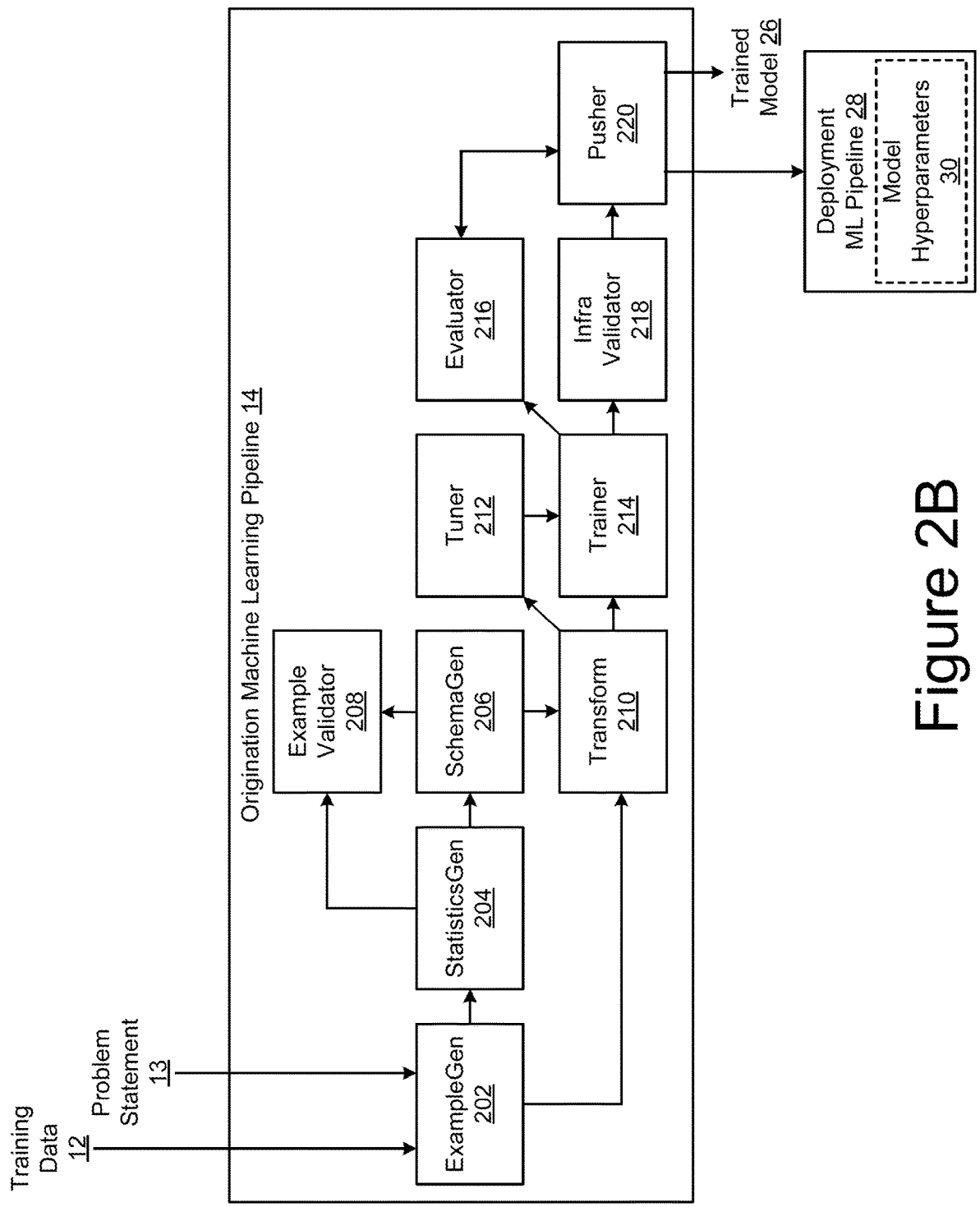
FIG. 2B depicts a block diagram of an example origination machine learning pipeline according to example implementations of the present disclosure.

FIG. 2B depicts an example, non-limiting alternative implementation of origination ML pipeline 14. The example origination ML pipeline 14 illustrated in FIG. 2B can be configured to receive training data 12 (e.g., training data 140 in FIG. 1) and, optionally, problem statement 13 from a user (e.g., via a GUI, an API, a REST API, a programmatic API, etc.). Execution of origination ML pipeline 14 illustrated in FIG. 2B can result in generation and exportation of trained model 26 (e.g., exportation via a GUI, an API, a REST API, a programmatic API, etc.). In at least one implementation, execution of origination ML pipeline 14 illustrated in FIG. 2B can result in generation and exportation (e.g., via a GUI, an API, a REST API, a programmatic API, etc.) of trained model 26 and/or deployment ML pipeline 28 (e.g., including model hyperparameters 30). The example origination ML pipeline 14 and deployment ML pipeline 28 depicted in FIG. 2B can each include computer-readable code that automates the workflow it takes to produce and/or run trained model 26 (e.g., to define, launch, and/or monitor trained model 26).

As illustrated in the example implementation depicted in FIG. 2B, origination ML pipeline 14 can include an ExampleGen component 202, a StatisticsGen component 204, a SchemaGen component 206, an Example Validator component 208, a Transform component 210, a Tuner component 212, a Trainer component 214, an Evaluator component 216, an Infra Validator component 218, and/or a Pusher component 220. The example implementation depicted in FIG. 2 illustrates how data can flow between such components of origination ML pipeline 14.

In the example implementation depicted in FIG. 2B, ExampleGen component 202 (e.g., scheduled workflow component 135 in FIG. 1) can be configured to receive and format training data 12 and, optionally, problem statement 13 to a format compatible to facilitate one or more operations of one or more components of origination ML pipeline 14. In some instances, the actions being performed by the ExampleGen component 202 can also be performed by the scheduled workflow component 135 in FIG. 1. In some implementations, ExampleGen component 202 can be configured to perform such formatting after it splits training data 12 into training and testing (e.g., evaluation) datasets, which results in two copies of ExampleGen component 202, one each for training and evaluation.

In the example implementation depicted in FIG. 2B, StatisticsGen component 204 can be configured to receive the formatted training data 12 (e.g., training data 140) from ExampleGen component 202. In this implementation, StatisticsGen component 204 can be configured to examine the formatted training data 12 and infer (e.g., calculate) one or more statistics corresponding to such formatted training data 12. In this way, StatisticsGen component 204 can be configured to generate one or more statistics descriptive of training data 12.

In some implementations, the StatisticsGen component 204 can also perform a statistical analysis to generate new features from the raw data. For example, the StatisticsGen component 204 can perform various statistical measures such as adjusted mutual information to understand correlations between different features that may enable the generation of additional feature data reflective or demonstrative of such correlations. The StatisticsGen component 204 can suggest the new features to the user and/or automatically generate and populate the new feature data.

In another example, new features can be automatically generated, by the system (e.g., system 100) by searching over large sets of data crosses to find correlations between feature crosses and labels. The StatisticsGen component 204 or Transform component 210 discussed below can suggest the new features to the user and/or automatically generate and populate the new feature data. For example, the StatisticsGen component 204 or Transform component 210 discussed below can provide a user interface by which a user can explore different feature crosses and their respective correlations to different labels, enabling the user to unlock additional levels of data insight, understanding, and interpretability. In addition, users can be enabled to use a relational database (e.g., paired with a structured query language) to create custom features on the fly.

In one or more implementations, origination ML pipeline 14 and/or StatisticsGen component 204 can be configured to store metadata descriptive of such one or more statistics in a library and/or a memory device that can be accessed by origination ML pipeline 14 and/or one or more components thereof to retrieve the metadata descriptive of the one or more statistics. For example, origination ML pipeline 14 and/or StatisticsGen component 204 can be configured to store metadata descriptive of such one or more statistics in a machine learning (ML) metadata library and/or a memory device that can be accessed by origination ML pipeline 14 and/or one or more components thereof to retrieve the metadata descriptive of the one or more statistics.

In the example implementation depicted in FIG. 2B, SchemaGen component 206 can be configured to receive the formatted training data 12 and/or the above-described statistics corresponding to such formatted training data 12 from StatisticsGen component 204. In this implementation, SchemaGen component 206 can be configured to examine such statistics and infer a data schema corresponding to the formatted training data 12. As referenced herein, "schema" can refer to a description of training data 12 that can be used by one or more components of origination ML pipeline 14. In some implementations, a schema as defined herein can include and/or constitute an instance and/or a type of a protocol buffer (also referred to as a "protobuf"). In some implementations, the schema can specify, for instance: data type(s) for feature value(s); whether a feature is to be present in all examples; allowed value ranges; and/or another property of training data 12.

In some implementations, the SchemaGen component 206 can be configured to use logic or heuristics to evaluate each feature and output a detected semantic type. Example semantic types include text, image, numerical, etc. As one example, if the feature values contain values that are contained within a color range and demonstrate a repeating structure common to imagery, then the tool can detect that the semantic type is imagery. In another example, if the features values contain only numerical numbers that do not demonstrate a repeating structure common to imagery, then the tool can detect that the semantic type is numerical. Likewise, if the features values contain only textual information, then the tool can detect that the semantic type is textual. The SchemaGen component 206 can automatically label the features with the detected semantic type.

In one or more implementations, origination ML pipeline 14 and/or SchemaGen component 206 can be configured to store metadata descriptive of such a data schema in a library and/or a memory device that can be accessed by origination ML pipeline 14 and/or one or more components thereof to retrieve the metadata descriptive of the data schema. For example, origination ML pipeline 14 and/or SchemaGen component 206 can be configured to store metadata descriptive of such a data schema in an ML metadata library and/or a memory device that can be accessed by origination ML pipeline 14 and/or one or more components thereof to retrieve the metadata descriptive of the data schema.

In the example implementation depicted in FIG. 2B, Example Validator component 208 can be configured to receive the above-described statistics and data schema from StatisticsGen component 204 and SchemaGen component 206, respectively. In this implementation, Example Validator component 208 can be configured to examine such statistics and data schema to identify any anomalies, missing values, and/or incorrect data types in the formatted training data 12.

In some implementations, to perform one or more of the above-described operations, ExampleGen component 202, StatisticsGen component 204, SchemaGen component 206, and/or Example Validator component 208 can be configured to leverage one or more capabilities of one or more libraries that can be accessed by and/or can provide the base functionality of such component(s) of origination ML pipeline 14. For example, in these implementations, such component(s) of origination ML pipeline 14 can be configured to leverage one or more libraries written in the Python programming language that provide the base functionality of such component(s). For instance, in one or more implementations, ExampleGen component 202, StatisticsGen component 204, SchemaGen component 206, and/or Example Validator component 208 can be configured to leverage one or more capabilities of a validation library (e.g., a tensorflow validation library). In these one or more implementations, such component(s) of origination ML pipeline 14 can be configured to leverage one or more capabilities of such a validation library to, for instance, perform initial exploration, visualization, and/or cleaning of training data 12. In these one or more implementations, such component(s) of origination ML pipeline 14 can be configured to leverage one or more capabilities of such a validation library to, for instance: examine training data 12 and infer the data types, categories, and/or ranges in training data 12 (e.g., via StatisticsGen component 204 and/or SchemaGen component 206); and/or identify anomalies, missing values, and/or incorrect data types in training data 12 (e.g., via Example Validator component 208).

In some implementations, ExampleGen component 202, StatisticsGen component 204, SchemaGen component 206, and/or Example Validator component 208 can be configured to leverage one or more capabilities of the above-described validation library and/or one or more visualization tools thereof to enable origination ML pipeline 14 and/or a user to examine and understand training data 12 (e.g., via metadata corresponding to training data 12). In some implementations, origination ML pipeline 14 and/or the user can query a machine learning metadata library to locate results of the executions of ExampleGen component 202, StatisticsGen component 204, SchemaGen component 206, and/or Example Validator component 208 and then use such one or more visualization tools (e.g., a visualization support API) of the validation library to create and/or view (e.g., via a monitor of a computing device associated with the user) such results of the executions (e.g., the above-described statistics, schema, etc.). In these implementations, after multiple executions of ExampleGen component 202, StatisticsGen component 204, SchemaGen component 206, and/or Example Validator component 208, origination ML pipeline 14 and/or the user can employ such one or more visualization tools to compare results corresponding to each of such multiple executions and then make adjustments as needed until origination ML pipeline 14 and/or the user is satisfied that training data 12 is in a desirable state to train a model such that it operates according to a certain application that can be defined by the user (e.g., via problem statement 13).

In at least one implementation, the above-described validation library can include and/or constitute a scalable library that can facilitate analyzing and/or validating machine learning data. In this implementation, such a validation library can facilitate operations that can include, but are not limited to: scalable calculation of summary statistics of training and test data; integration with a viewer for data distributions and statistics and/or faceted comparison of pairs of datasets; automated data-schema generation to describe expectations about data such as, for example, required values, ranges, and/or vocabularies; inspection of the schema via, for instance, a schema viewer; anomaly detection to identify anomalies such as, for example, missing features, out-of-range values, and/or wrong feature types; inspection of such anomalies via, for instance, an anomalies viewer to enable a user to see what features have anomalies and learn more in order to correct them; and/or another operation.

In some implementations, after an initial model training and deployment (e.g., training and deployment of trained model 26), ExampleGen component 202, StatisticsGen component 204, SchemaGen component 206, and/or Example Validator component 208 can each be configured to leverage one or more capabilities of the above-described validation library to, for instance: monitor new data from inference requests submitted to trained model 26 after it has been deployed by origination ML pipeline 14 as described below; and/or identify anomalies and/or drift. In these implementations, such operations are beneficial when applied to time series data that changes over time as a result of a trend or seasonality and can further help inform a user when there are data problems or when trained model 26 needs to be retrained on new data. In these implementations, another benefit of such a validation library is that it can be used (e.g., by SchemaGen component 206) to generate a schema by inferring data types, categories, and/or ranges from training data 12.

In the example implementation depicted in FIG. 2B, Transform component 210 can be configured to perform feature engineering on training data 12. For example, in at least one implementation, Transform component 210 can be configured to receive the above-described formatted and/or split training data 12, statistics, and schema and apply data transformations to create, combine, and/or transform the features that will be used to train a candidate ML model (e.g., a certain ML architecture that can be instantiated, trained, and/or evaluated as described herein in accordance with one or more implementations). In this at least one implementation, Transform component 210 can be configured to further cleanup missing values and/or convert data types corresponding to training data 12. For instance, Transform component 210 can be configured to clean up missing values and/or convert data types corresponding to training data 12 in implementations where there is a possibility that these will also be present in data sent for inference requests (e.g., to trained model 26).

In some implementations, to perform the above-described feature engineering operations, Transform component 210 can be configured to leverage one or more capabilities of one or more libraries that can be accessed by and/or can provide the base functionality of Transform component 210. For example, in these implementations, Transform component 210 can be configured to leverage one or more capabilities of one or more libraries written in the Python programming language that provide the base functionality of Transform component 210. For instance, in one or more implementations, Transform component 210 can be configured to leverage one or more capabilities of a transform library that can facilitate preprocessing of training data 12. By way of example, in these one or more implementations, Transform component 210 can be configured to leverage one or more capabilities of such a transform library to perform preprocessing operations on training data 12 that can include, but are not limited to: normalizing an input value by mean and standard deviation; converting strings to integers by generating a vocabulary over all input values; converting floats to integers by assigning them to buckets based on the observed data distribution; and/or another operation.

In some implementations, the output of Transform component 210 can include and/or constitute a serialization of a model that can be referred to herein as a "SavedModel" and can include all the data engineering transformations that were created by Transform component 210. As referenced herein, a "SavedModel" can refer to a universal, language-neutral, hermetic, recoverable serialization of a model. For example, a SavedModel as referenced herein can include and/or constitute the recommended serialization format that can be used by origination ML pipeline 14 and/or one or more components thereof to serve a model in production or export a trained model for a certain computing device (e.g., a smart phone, tablet, etc.) and/or a certain software application (e.g., a software application written in a certain language). For instance, to facilitate conversion of a model into a representational state transfer (REST) service to make predictions, origination ML pipeline 14 can serialize a model as a SavedModel and serve it (e.g., using one or more capabilities of a serving library). In the above examples, a benefit of such a SavedModel is that it enables higher-level systems to produce, transform, and/or consume models using a single abstraction. Additionally, and/or alternatively, a "model" as referenced herein can refer to the output of a training process. For example, a model as referenced herein can include and/or constitute the serialized record of weights that have been learned during the training process and/or weights that have been learned up to a certain point in the training process. In some implementations of the present disclosure, such weights can be subsequently used to compute predictions for new input examples.

In some implementations described herein, Tuner component 212 can be configured to search an optimization domain as defined herein to identify a candidate ML model (hereinafter, "candidate model") having a certain ML model architecture (e.g., certain parameters, hyperparameters, model hyperparameters 30, etc.) that can satisfy an objective of a user (e.g., an objective defined in problem statement 13). In these implementations, such a search of the optimization domain can constitute an ML model architecture search that can be performed by Tuner component 212 to identify one or more candidate models that can be instantiated, trained, evaluated, and/or deployed as described herein in accordance with one or more implementations of the present disclosure.

In some implementations, to perform the above-described ML model architecture search to identify a candidate model, Tuner component 212 can be configured to select a number of seed or initial models or model types based on the feature data. In one example, a list of constraints can be identified, where the constraints indicate types (e.g., semantic types) of feature data that the resulting model should be able or optimized to process. As one example, constraints can be specified by the user. Additionally, or alternatively, the constraints can correspond to or be derived from the semantic types that were automatically detected by the SchemaGen component 206.

The Tuner component 212 can use the constraints to select a number of seed or initial models or model types (e.g., from a list of candidate models or model types). For example, the Tuner component 212 can use logic (e.g., encoded in a look up table) to identify models or model types that satisfy the constraints. As one example, if the semantic type of a feature is imagery, then the Tuner component 212 may limit the seed or initial models to convolutional neural networks, vision transformers, or other models or model types that are known to provide superior performance relative to imagery.

In some implementations, to perform the above-described ML model architecture search to identify a candidate model, Tuner component 212 can be configured to employ an algorithm that can search the optimization domain to identify the relatively best ML model architecture (e.g., parameters, hyperparameters, model hyperparameters 30, etc.) based on a certain objective (e.g., an objective that can be defined by a user in problem statement 13). For instance, Tuner component 212 can be configured to employ a search algorithm, a tuner algorithm, a Gaussian algorithm and/or process, a neural architecture search (NAS) algorithm, a reinforcement learning (RL) algorithm, and/or another algorithm to identify the relatively best ML model architecture (e.g., parameters, hyperparameters, model hyperparameters 30, etc.) based on a certain objective (e.g., an objective that can be defined by a user in problem statement 13). In some implementations, to perform the ML model architecture search and/or identify the one or more candidate models, Tuner component 212 can be configured to leverage one or more capabilities of one or more libraries that can be accessed by and/or can provide the functionality of Tuner component 212. For example, in these implementations, Tuner component 212 can be configured to leverage one or more capabilities of one or more libraries written in the Python programming language that can enable Tuner component 212 to perform the ML model architecture search and/or identify the one or more candidate models.

In some implementations, Tuner component 212 can be configured to perform the above-described ML model architecture search based at least in part on training data 12, problem statement 13, and/or one or more attributes corresponding to training data 12 and/or problem statement 13. For instance, in an example implementation, Tuner component 212 can be configured to perform the ML model architecture search based at least in part on metadata descriptive of training data 12, problem statement 13, and/or one or more attributes corresponding to training data 12 and/or problem statement 13. For example, Tuner component 212 can be configured to perform the ML model architecture search based at least in part on the above-described metadata descriptive of the statistics and/or schema that can be stored in, for instance, an ML metadata library by StatisticsGen component 204 and SchemaGen component 206, respectively.

In another example implementation, Tuner component 212 can be configured to infer, based on problem statement 13, one or more parameters of the optimization domain to identify such a candidate model having a certain ML model architecture (e.g., certain parameters, hyperparameter, model hyperparameters 30, etc.). In another example implementation, Tuner component 212 and/or one or more other components of origination ML pipeline 14 (e.g., ExampleGen component 202, StatisticsGen component 204, SchemaGen component 206, Example Validator component 208, and/or Transform component 210) can be configured to detect a semantic type for one or more features of a plurality of features included in training data 12. In this example implementation, Tuner component 212 can be configured to perform the above-described ML model architecture search based at least in part on such detected semantic type for one or more features of a plurality of features included in training data 12. For instance, in this example implementation, Tuner component 212 can be configured to constrain the ML model architecture search to candidate model architectures capable of processing the semantic type detected for the one or more features of the plurality of features included in training data 12.

In some implementations, the output of Tuner component 212 can include and/or constitute one or more parameters and/or hyperparameters (e.g., values of one or more parameters and/or hyperparameter) of a candidate model that can be identified by Tuner component 212 when searching an optimization domain as described above. For example, in some implementations, the output of Tuner component 212 can include and/or constitute model hyperparameters 30 (e.g., values of model hyperparameters 30), which can constitute hyperparameters of a candidate model that can be identified by Tuner component 212 when searching an optimization domain as described above. In these or other implementations, origination ML pipeline 14 and/or Tuner component 212 can be configured to store such one or more parameters and/or hyperparameters (e.g., to store model hyperparameters 30). In one or more implementations, origination ML pipeline 14 and/or Tuner component 212 can be configured to store metadata descriptive of such one or more parameters and/or hyperparameters (e.g., model hyperparameters 30) in a library and/or a memory device that can be accessed by origination ML pipeline 14 and/or one or more components thereof to retrieve the metadata descriptive of the one or more parameters and/or hyperparameters. For example, in one implementation, origination ML pipeline 14 and/or Tuner component 212 can be configured to store metadata descriptive of such one or more parameters and/or hyperparameters (e.g., model hyperparameters 30) in a library an ML metadata library and/or a memory device that can be accessed by origination ML pipeline 14 and/or one or more components thereof to retrieve the metadata descriptive of the one or more parameters and/or hyperparameters. In this implementation, storing such metadata descriptive of the one or more parameters and/or hyperparameters (e.g., model hyperparameters 30) in such a library and/or a memory device can constitute storing metadata descriptive of the performance (e.g., results) of the above-described ML model architecture search of the optimization domain that can be performed by Tuner component 212.

In some implementations of the present disclosure, Tuner component 212 can be configured to tune one or more parameters and/or hyperparameters of a candidate model. In some implementations (e.g., as described below with reference to FIG. 4), Tuner component 212 can be configured to re-tune one or more parameters and/or hyperparameters of a previously trained model (e.g., trained model 26). For example, in some implementations, Tuner component 212 can be configured to tune one or more parameters and/or hyperparameters such as, for instance, number of layers of the candidate model and/or another parameter and/or hyperparameter. In an example implementation, Tuner component 212 can be configured to tune one or more parameters and/or hyperparameters of a candidate model based on (e.g., using and/or according to) the stored metadata descriptive of training data 12 and the performance (e.g., results) of the above-described ML model architecture search that can be performed by Tuner component 212. In this example implementation, such tuning of one or more parameters and/or hyperparameters of a candidate model based on the stored metadata descriptive of training data 12 and the performance (e.g., results) of the above-described ML model architecture search can constitute tuning of one or more parameters and/or hyperparameters of and/or associated with origination ML pipeline 14 based on such stored metadata.

In these implementations, to tune one or more parameters and/or hyperparameters of a candidate model, Tuner component 212 can be configured to employ an algorithm that can search the above-described optimization domain to identify the relatively best parameters and/or hyperparameters for the candidate model based on a certain objective (e.g., an objective that can be defined by a user in problem statement 13). For instance, Tuner component 212 can be configured to employ a search algorithm, a tuner algorithm, a Gaussian algorithm and/or process, a neural architecture search (NAS) algorithm, a reinforcement learning (RL) algorithm, and/or another algorithm to identify the relatively best parameters and/or hyperparameters for the candidate model. In some implementations, to tune one or more parameters and/or hyperparameters of a candidate model, Tuner component 212 can be configured to leverage one or more capabilities of one or more libraries that can be accessed by and/or can provide the functionality of Tuner component 212. For example, in these implementations, Tuner component 212 can be configured to leverage one or more capabilities of one or more libraries written in the Python programming language that can enable Tuner component 212 to tune such one or more parameters and/or hyperparameters of the candidate model.

In the example implementation depicted in FIG. 2B, Trainer component 214 can be configured to train a candidate model. For example, in some implementations, Trainer component 214 can be configured to receive the above-described SavedModel, candidate model, and/or one or more parameters and/or hyperparameters of the candidate model from Transform component 210 and/or Tuner component 212. In these implementations, the SavedModel and/or candidate model can include all the data engineering transformations that were created by Transform component 210 such that the identical transforms can be performed using the exact same computer-readable code during both training and inference (e.g., the above-described computer-readable code that can be included in and/or used by origination ML pipeline 14 to automate the workflow it takes to produce and/or run trained model 26). In these implementations, by using such exact same computer-readable code (also referred to herein as "modeling code"), including the SavedModel and/or candidate model, Trainer component 214 can consume training data 12 (e.g., training data 12 that has been split into training and evaluation data) and train the candidate model.

In some implementations, to train a candidate model, Trainer component 214 can be configured to leverage one or more capabilities of one or more libraries that can be accessed by and/or can provide the base functionality of Trainer component 214. For example, in these implementations, Trainer component 214 can be configured to leverage one or more capabilities of one or more libraries written in the Python programming language that provide the base functionality of Trainer component 214. For instance, in one or more implementations, Trainer component 214 can be configured to leverage one or more capabilities of a library (e.g., a tensorflow library) that ingests training data and modeling code and creates a SavedModel result. In these one or more implementations, such a library can also integrate a feature engineering pipeline that can be created by Transform component 210 to preprocess input data (e.g., training data 12).

In implementations involving an Estimator based model, Trainer component 214 can be configured to save a trained candidate model as both a SavedModel and an "EvalSavedModel" that becomes the basis for the analysis performed by Evaluator component 216 as described below. In these implementations, saving such a trained candidate model as an EvalSavedModel ensures the metrics used at training time are also available during evaluation by Evaluator component 216. In these implementations, to facilitate saving the trained candidate model as an EvalSavedModel, Trainer component 214 can be configured to leverage one or more capabilities of a library that can be accessed by and/or can provide the functionality of Trainer component 214. For example, in these implementations, Trainer component 214 can be configured to leverage one or more capabilities of a model analysis library described below with reference to Evaluator component 216.

In the example implementation depicted in FIG. 2B, Evaluator component 216 can be configured to perform a deep analysis of training results from training a candidate model (e.g., via Trainer component 214) and to facilitate validation of such a candidate model to ensure it is satisfactory to be pushed to production. In some instances, Evaluator component 216 can utilize the testing data 145 described in FIG. 1 to evaluate and/or analyze the model's performance. In some implementations, following initial model development and training as described above, Evaluator component 216 can be configured to analyze the model's performance. For example, in these implementations, Evaluator component 216 can be configured to receive a trained model (e.g., as a SavedModel) and analyze the model's performance based on a slice of training data 12 (e.g., a list of data items, features, labels of training data 140) and/or testing data (e.g., testing data 145). For instance, in these implementations, Evaluator component 216 can be configured to analyze the model's performance against a slice of training data 12 and/or testing data including one or more particular categories for categorical features, one or more particular ranges for numerical features, another slice of training data 12, and/or testing data.

In the above implementations, such analysis of the performance of a trained candidate model against such a slice of training data 12 can be beneficial in understanding the model's performance with respect to, for instance, different segments of entities (e.g., customers) associated with origination ML pipeline 14 and/or the outputs thereof (e.g., trained model 26 and/or deployment ML pipeline 28). In these implementations, Evaluator component 216 can be configured to segment the entities by, for instance, annual purchases, geographical data, age group, gender, and/or another attribute. In these implementations, such analysis by Evaluator component 216 can be especially beneficial for datasets with long tails, where the performance of the trained candidate model with respect to a dominant group may mask unacceptable performance of the model with respect to one or more smaller groups. For example, Evaluator component 216 can determine that the trained candidate model can perform relatively well for average employees but performs relatively poorly for executive staff, and this information may be useful to a user implementing origination ML pipeline 14.

In some implementations, to evaluate the performance of a trained candidate model, Evaluator component 216 can be configured to leverage one or more capabilities of one or more libraries that can be accessed by and/or can provide the base functionality of Evaluator component 216. For example, in these implementations, Evaluator component 216 can be configured to leverage one or more capabilities of one or more libraries written in the Python programming language that provide the base functionality of Evaluator component 216. For instance, in one or more implementations, Evaluator component 216 can be configured to leverage one or more capabilities of a model analysis library. In these one or more implementations, Evaluator component 216 can be configured to leverage such one or more capabilities of the model analysis library to create an EvalSavedModel that then becomes the basis for the analysis by Evaluator component 216. In these one or more implementations, such a model analysis library can enable Evaluator component 216 to evaluate a trained candidate model on large amounts of data in a distributed manner, using the same metrics defined by Trainer component 214. In some implementations, such metrics can be computed over different slices of training data 12 and/or visualized for viewing by, for instance, a user implementing origination ML pipeline 14.

In some implementations, Evaluator component 216 can be configured to leverage one or more capabilities of the above-described model analysis library and/or one or more visualization tools thereof to enable origination ML pipeline 14 and/or a user to examine and understand results of the model performance analysis that can be performed by Evaluator component 216 as described above. In some implementations, origination ML pipeline 14 and/or the user can query a machine learning metadata library to locate results of the executions of Evaluator component 216 and then use such one or more visualization tools (e.g., a visualization support API) of the model analysis library to create and/or view (e.g., via a monitor of a computing device associated with the user) such results of the executions (e.g., the above-described performance results with respect to one or more slices of training data 12). In these implementations, after multiple executions of Evaluator component 216 (e.g., multiple performance analyses of the trained candidate model against different slices of training data 12), origination ML pipeline 14 and/or the user can employ such one or more visualization tools to compare results corresponding to each of such multiple executions and then make adjustments to the trained candidate model as needed (e.g., via Transform component 210, Trainer component 214, Tuner component 212, etc.) until origination ML pipeline 14 and/or the user is satisfied that the model and/or the results produced by the model can achieve a certain objective and/or application that can be defined by the user (e.g., via problem statement 13).

In some implementations, as part of analyzing the performance of a trained candidate model, Evaluator component 216 can be configured to validate the performance of the model against a baseline such as, for instance, a currently serving model (e.g., a model currently executing on an infrastructure of a computing system). In these implementations, Evaluator component 216 can be configured to receive both a trained candidate model (e.g., as a SavedModel) and a baseline model (e.g., a model currently executing on a computing system infrastructure). In these implementations, Evaluator component 216 can be configured to compute metrics (e.g., area under the curve (AUC), loss, etc.) for both the trained candidate model and the baseline model along with, for instance, a corresponding set of differentiating metrics. In these implementations, origination ML pipeline 14 and/or Evaluator component 216 can then apply and use one or more thresholds to gate push the trained candidate model and/or one or more other models (e.g., one or more other SavedModels) subsequently generated by origination ML pipeline 14 to production.

In the example implementation depicted in FIG. 2B, Infra Validator component 218 can be configured to determine whether a trained candidate model is servable from a certain infrastructure (e.g., an infrastructure of a computing system and/or device associated with origination ML pipeline 14). In one or more implementations, Infra Validator component 218 can be configured to determine whether a trained candidate model is servable in a production environment to ensure that such a model does not prevent the system from serving predictions. In some instances, Infra Validator component 218 can utilize testing data (e.g., testing data 145 to perform such a determination. In these one or more implementations, to perform such a determination, Infra Validator component 218 can be configured to implement a canary deployment of the trained candidate model in a sandboxed environment (e.g., a deployment of the model in a canary model server), and optionally send real requests to check that the trained candidate model works correctly. In some implementations, if it is determined by Infra Validator component 218 that the trained candidate model is not servable from such a certain infrastructure, Infra Validator component 218 can prevent such a model from being pushed to production.

In the example implementation depicted in FIG. 2B, Pusher component 220 can be configured to deploy a trained model (e.g., a SavedModel, trained candidate model, trained model 26, etc.) generated by origination ML pipeline 14 onto a serving infrastructure where such a model can receive inference requests. For example, in implementations where Infra Validator component 218 determines that a trained model (e.g., a SavedModel, trained candidate model, trained model 26, etc.) is servable from a certain serving infrastructure, Pusher component 220 can be configured to deploy the model onto the serving infrastructure. In some implementations, such deployment by Pusher component 220 onto such a serving infrastructure can include handling (e.g., deploying, managing, implementing, modifying, etc.) multiple versions of the trained model and/or model updates corresponding to the trained model and/or multiple versions thereof (e.g., via deployment ML pipeline 28 and/or model hyperparameters 30 as described below with reference to FIG. 3).

In some implementations, to deploy such a trained model (e.g., a SavedModel, trained candidate model, trained model 26, etc.) onto a serving infrastructure, Pusher component 220 can be configured to leverage one or more capabilities of a library and/or a system that can serve machine learning models in a production environment. For example, in these implementations, Pusher component 220 can be configured to leverage one or more capabilities of a serving system that can consume a SavedModel and accept inference requests via an interface component (e.g., a REST API). In these implementations, such a service system that can be employed by Pusher component 220 to deploy a trained model onto a service infrastructure can be configured to run as a set of processes on one or more network servers, using one of several advanced architectures to handle synchronization and distributed computation.

Example Deployment Machine Learning Pipeline

Figure 3:
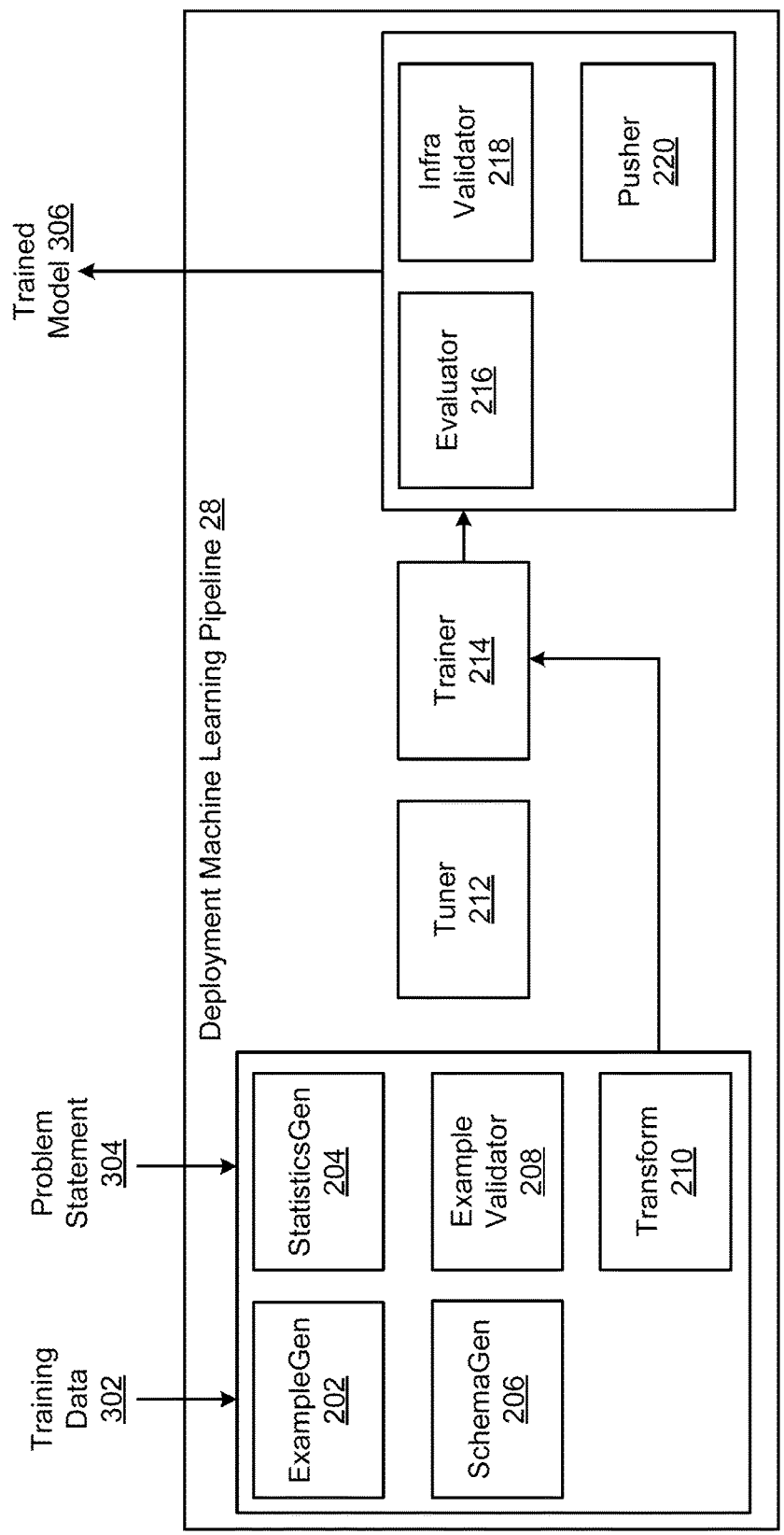
FIG. 3 depicts a block diagram of an example deployment machine learning pipeline according to example implementations of the present disclosure.

FIG. 3 depicts an example, non-limiting implementation of deployment ML pipeline 28. The example deployment ML pipeline 28 illustrated in FIG. 3 can be configured to receive training data 302 (e.g., training data 140) and, optionally, problem statement 304 from a user (e.g., via a GUI, an API, a REST API, a programmatic API, etc.). Execution of deployment ML pipeline 28 illustrated in FIG. 3 can result in generation and exportation of trained model 306 (e.g., exportation via a GUI, an API, a REST API, a programmatic API, etc.). The example deployment ML pipeline 28 depicted in FIG. 3 can include computer-readable code that automates the workflow it takes to produce and/or run trained model 306 (e.g., to define, launch, and/or monitor trained model 306).

As illustrated in the example implementation depicted in FIG. 3, deployment ML pipeline 28 can include ExampleGen component 202, StatisticsGen component 204, SchemaGen component 206, Example Validator component 208, Transform component 210, Tuner component 212, Trainer component 214, Evaluator component 216, Infra Validator component 218, and/or Pusher component 220, which can perform their respective operations in the same manner as described above with reference to FIG. 2B. The example implementation depicted in FIG. 3 illustrates how data can flow between such components of deployment ML pipeline 28.

In the example implementation illustrated in FIG. 3, Trainer component 214 can be configured to retrain an ML model. For example, in this implementation, following execution of origination ML pipeline 14 to generate and/or deploy trained model 26 and/or deployment ML pipeline 28 (e.g., including model hyperparameters 30) as described above with reference to FIG. 2B, Trainer component 214 can retrain trained model 26 based on (e.g., using) training data 302 and, optionally, problem statement 304. In this implementation, training data 302 can include training data that is different from that of training data 12 (e.g., training data 140) and/or problem statement 304 can include a problem definition that is different from that of problem statement 13.

In some instances, the system 100 can automatically generate training data 302 using the techniques described in FIG. 1.

In the example implementation depicted in FIG. 3, ExampleGen component 202, StatisticsGen component 204, SchemaGen component 206, Example Validator component 208, and/or Transform component 210 can be configured to perform their respective operations (e.g., operations described above with reference to FIG. 2B) on training data 302 and/or problem statement 304 in the same manner as they performed such operations on training data 12 and/or problem statement 13. In this implementation, based on the respective outputs of such components that can be produced for training data 302 and, optionally, problem statement 304, Trainer component 214 can use such outputs to retrain trained model 26 and thereby produce trained model 306. In some implementations of the present disclosure, Trainer component 214 can be configured to retrain trained model 26 with (e.g., using) a fixed list of feature columns and thereby produce trained model 306. In the example implementation depicted in FIG. 3, Evaluator component 216, Infra Validator component 218, and/or Pusher component 220 can be configured to perform their respective operations (e.g., operations described above with reference to FIG. 2B) on trained model 306 such that after a satisfactory evaluation of trained model 306 (e.g., via Evaluator component 216) and a satisfactory evaluation of a target deployment infrastructure (e.g., via Infra Validator 218), Pusher component 220 can deploy trained model 306 to the target deployment infrastructure.

Example Methods

Figure 4:
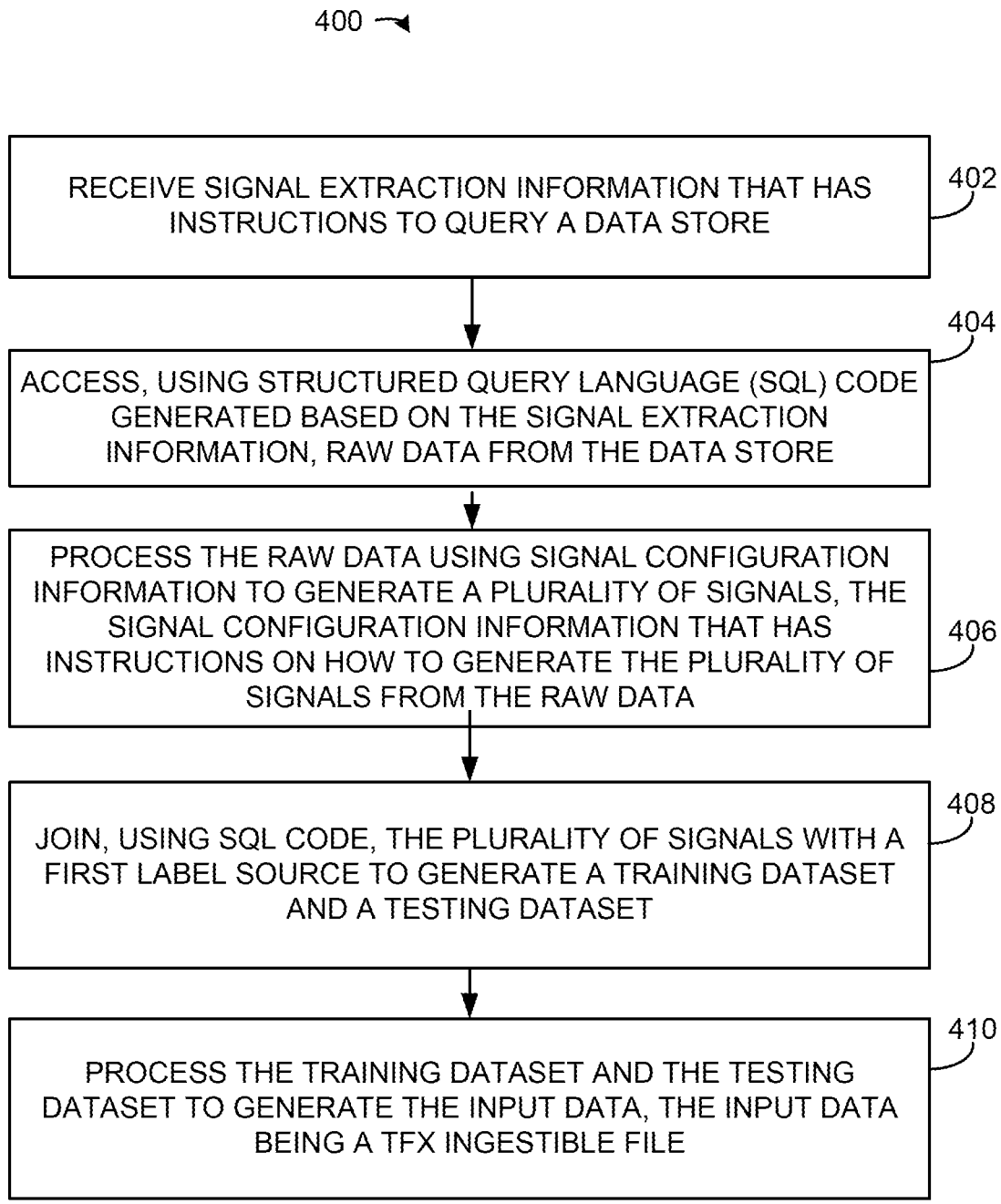
FIG. 4 depicts a flow chart diagram of an example method to perform according to example embodiments of the present disclosure.

FIG. 4 depicts a flow chart diagram of an example method to perform according to example embodiments of the present disclosure. Although FIG. 4 depicts steps performed in a particular order for purposes of illustration and discussion, the methods of the present disclosure are not limited to the particularly illustrated order or arrangement. The various steps of method 400 can be omitted, rearranged, combined, and/or adapted in various ways without deviating from the scope of the present disclosure.

At 402, a computing system (e.g., computing system 100) can receive signal extraction information that has instructions to query a data store (e.g., data store 105). For example, the signal extraction information can be transmitted by the signal extractor library 120.

In some instances, the data store can include a first data source and a second data source, and the signal extraction information can include instructions to query the first data source and the second data source. The first data source can be a different type than the second data source. For example, the first data source is a column in a first dataset and the second data source is a human-generated label in a second dataset.

In some instances, the computing system can receive, from a user input, the signal configuration information that has instructions to generate the plurality of signals from the raw data. For example, the user input can include custom code to be executed using an on-the-fly operation. The custom code can define a first signal and how to generate the first signal using the raw data. The first signal is a new signal when it was not generated in a prior iteration of the plurality of signals. The new signal can be either an inferred signal or a base signal. An inferred signal can be directly generated from the raw data, while the base signal can be derived by processing (e.g., by executing custom code) a plurality of inputs obtained from the raw data.

Thus, when the first signal is an inferred signal, method 400 can further include the computer system determining that the inferred signal is a new signal because the inferred signal was not previously generated in the prior iteration of the plurality of signals and determining to omit the backfilling of the new signal because the inferred signal can be directly generated from the raw data.

Alternatively, when the first signal is a base signal method 400 can further include the computer system backfilling the base signal using an on-the-fly operation, where the on-the-fly operation prevents a full-fledged backfill operation. As previously mentioned, the new signal can be a base signal when it was not generated in a prior iteration of the plurality of signals and can be being derived by processing a plurality of inputs obtained from the raw data, the method further comprising:

At 404, the computing system can access, using Structured Query Language (SQL) code generated based on the signal extraction information, raw data from the data store.

At 406, the computing system can process the raw data using signal configuration information to generate a plurality of signals, the signal configuration information that has instructions on how to generate the plurality of signals from the raw data. For example, the plurality of signals generated at 406 can be the generated signals in the signal database 115 as described in FIG. 1.

In some instances, the plurality of signals can be stored in a table pointing to a file dump containing all signals utilized by the machine-learning model, and wherein the table is configured, using a table alias generator, to point to the file dump that is current.

At 408, the computing system can join, using SQL code, the plurality of signals (e.g., from the signal database 115) with a first label source (e.g., label sources 130) to generate a training dataset (e.g., training data 140) and a testing dataset (testing data 145). For example, the training dataset can be utilized during the training of the machine-learning model, and the testing dataset can be utilized during the validation testing of the machine-learning model.

In some instances, when generating the training dataset and the testing dataset at 408, the computing system can perform, based on a custom request, a custom-split of the training dataset and the testing dataset. For example, the custom request can be a date reference, where the training dataset is associated with data prior to the date reference and the testing dataset is associated with data after the date reference. In another example, the custom request can be a time reference (e.g., cut-off time), where the training dataset is associated with data prior to the time reference and the testing dataset is associated with data after the time reference. Additionally, the machine-learning model can be trained on non-independent and identically distributed (IID) data which may require a custom-split of the training dataset and the testing dataset.

In some instances, method 400 can further include the computing system joining, using SQL code, the plurality of signals and the first label source (e.g., label sources 130) with a second label source (e.g., label sources 130) to generate the training dataset and the testing dataset. The first label source can be a different system than the second label source. For example, the first label source can be an annotated dataset that has human-generated labels, and the second label source can be a data source that has feedback information based on user interaction.

Additionally, the first label source can be associated with a first sample weight, and the second label source is associated with a second sample weight. Subsequently, the joining of the plurality of signals and the first label source with the second label source at 408 can be further based on the first sample weight and the second sample weight. The first sample weight can be based on a confidence level (e.g., based on confidence of the data source) associated with the first label source, and the second sample weight is based on a different confidence level associated with the second label source. For example, a well-known and established data source can have a higher confidence level than a less known and established data source.

At 410, the computing system can process the training dataset and the testing dataset to generate the input data, the input data being a TFX ingestible file. For example, the computing system 100 can use the input data (e.g., training data 140 and testing data 145) obtained from the schedule workflow component 135 and ingest the input data into TFX pipeline 155 using a TFX ImportExample component 150. The input data can be inputted into a TFX ImportExample component 150 to be utilized downstream in a TFX pipeline 155. For example, the different use cases (e.g., model retraining) can be performed in the TFX pipeline 155.

In some instances, method 400 can further include the computing system transmitting an alert when an error occurs during the generating of the plurality of signals.

In some instances, method 400 can further include the computing system transmitting an alert when an error occurs during the generating of the training dataset or the testing dataset.

Example Devices and Systems

Figure 5A:
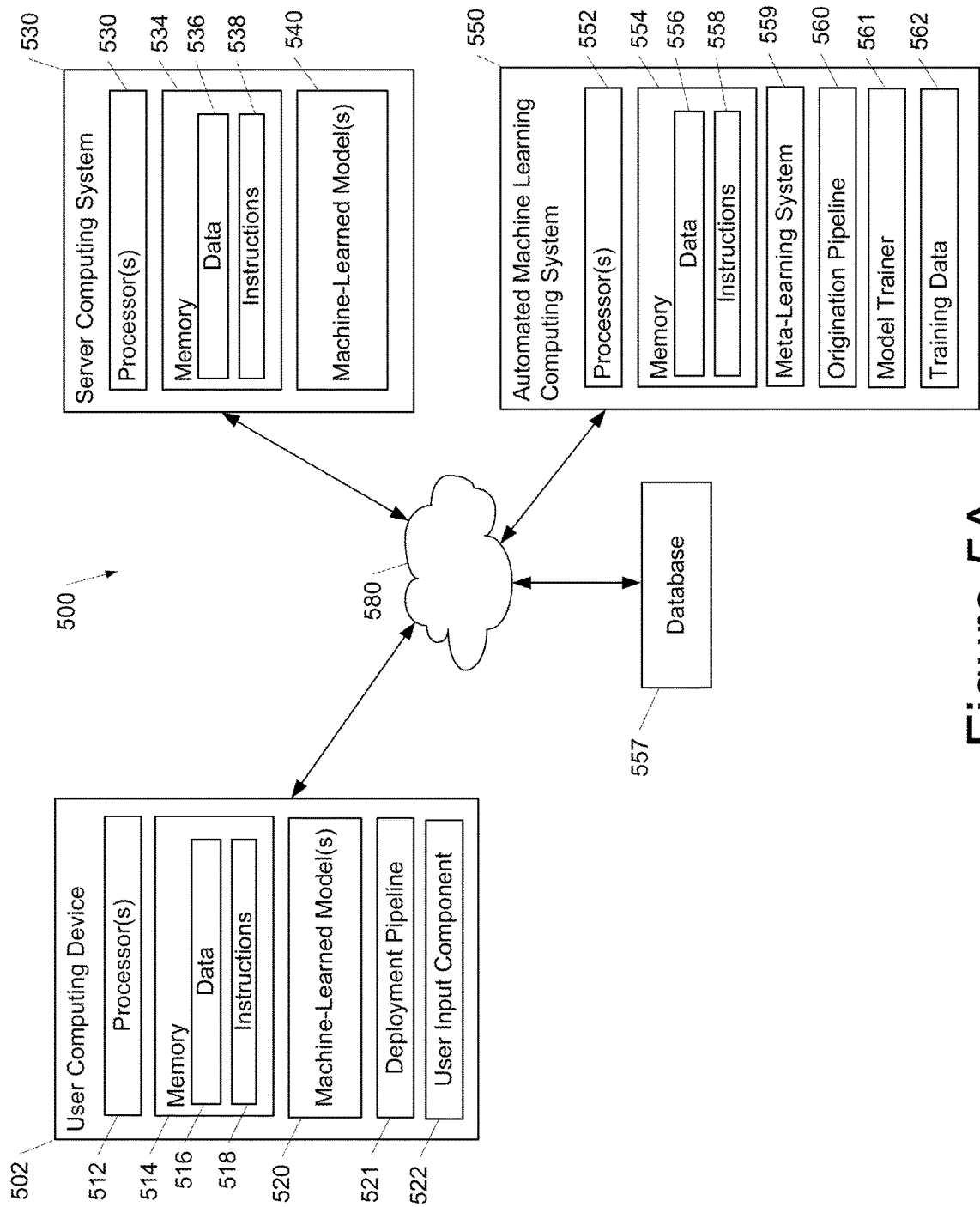
FIG. 5A depicts a block diagram of an example computing system according to example implementations of the present disclosure.

FIG. 5A depicts a block diagram of an example computing system 500 according to example implementations of the present disclosure. The system 500 includes a user computing device 502, a server computing system 530, and an automated machine learning system 550 that are communicatively coupled over a network 580.

The user computing device 502 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 502 includes one or more processors 512 and a memory 514. The one or more processors 512 can be any suitable processing device (e.g., a processor core, a microprocessor, an ASIC, an FPGA, a controller, a microcontroller, etc.) and can be one processor or a plurality of processors that are operatively connected. The memory 514 can include one or more non-transitory computer-readable storage media, such as RAM, ROM, EEPROM, EPROM, flash memory devices, magnetic disks, etc., and combinations thereof. The memory 514 can store data 516 and instructions 518 which are executed by the processor 512 to cause the user computing device 502 to perform operations.

In some implementations, the user computing device 502 can store or include one or more machine-learned models 520 and one or more deployment pipelines 521 that enable deployment of the models 520. For example, the machine-learned models 520 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 520 and corresponding origination and deployment pipelines are discussed with reference to FIGS. 1-4.

In some implementations, the one or more machine-learned models 520 can be received from the server computing system 530 over network 580, stored in the user computing device memory 514, and then used or otherwise implemented by the one or more processors 512. In some implementations, the user computing device 502 can implement multiple parallel instances of a single machine-learned model 520.

Additionally, or alternatively, one or more machine-learned models 540 can be included in or otherwise stored and implemented by the server computing system 530 that communicates with the user computing device 502 according to a client-server relationship. For example, the machine-learned models 540 can be implemented by the server computing system 540 as a portion of a web service. Thus, one or more models 520 can be stored and implemented at the user computing device 502 and/or one or more models 540 can be stored and implemented at the server computing system 530.

The user computing device 502 can also include one or more user input components 522 that receives user input. For example, the user input component 522 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 530 includes one or more processors 532 and a memory 534. The one or more processors 532 can be any suitable processing device (e.g., a processor core, a microprocessor, an ASIC, an FPGA, a controller, a microcontroller, etc.) and can be one processor or a plurality of processors that are operatively connected. The memory 534 can include one or more non-transitory computer-readable storage media, such as RAM, ROM, EEPROM, EPROM, flash memory devices, magnetic disks, etc., and combinations thereof. The memory 534 can store data 536 and instructions 538 which are executed by the processor 532 to cause the server computing system 530 to perform operations.

In some implementations, the server computing system 530 includes or is otherwise implemented by one or more server computing devices. In instances in which the server computing system 530 includes plural server computing devices, such server computing devices can operate according to sequential computing architectures, parallel computing architectures, or some combination thereof.

As described above, the server computing system 530 can store or otherwise include one or more machine-learned models 540 and one or more deployment pipelines 541 that enable deployment of the models 541. For example, the models 540 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 540 and corresponding origination and deployment pipelines are discussed with reference to FIGS. 1-4.

The user computing device 502 and/or the server computing system 530 can train the models 520 and/or 540 via interaction with the automated machine learning system 550 that is communicatively coupled over the network 580. The automated machine learning system 550 can be separate from the server computing system 530 or can be a portion of the server computing system 530.

The automated machine learning system 550 includes one or more processors 552 and a memory 554. The one or more processors 552 can be any suitable processing device (e.g., a processor core, a microprocessor, an ASIC, an FPGA, a controller, a microcontroller, etc.) and can be one processor or a plurality of processors that are operatively connected. The memory 554 can include one or more non-transitory computer-readable storage media, such as RAM, ROM, EEPROM, EPROM, flash memory devices, magnetic disks, etc., and combinations thereof. The memory 554 can store data 556 and instructions 558 which are executed by the processor 552 to cause the automated machine learning system 550 to perform operations. In some implementations, the automated machine learning system 550 includes or is otherwise implemented by one or more server computing devices.

The automated machine learning system 550 can be in communication with a database 557 that contains datasets associated with a number of different tasks and/or domains. The database 557 can be used to provide an improved benchmarking system. The benchmarking system can be used with the automated model and pipeline generation tools described herein, but can also be used by any other models or systems. In particular, example model benchmarking systems provided by the present disclosure can include a large number (e.g., hundreds, thousands, etc.) of different datasets (e.g., training datasets, validation datasets, etc.) and associated metadata that correspond to a number of different machine-learning tasks (e.g., classification tasks, generative tasks, vision tasks, etc.) or domains (e.g., imagery, text, audio, natural language, sensor data, statistical data, etc.). As examples, the metadata associated with each dataset can include: (a) properties of the dataset; (b) problem statements; (c) feature engineering transformations; (d) hyperparameter search space; (e) training logs and signals; and/or (f) model quality metrics associated with each combination of hyperparameters.

These datasets can be stored in the database 557 and can be used to build a testing framework to test the quality of the automated machine learning system 550 in a rigorous and systematic way. For example, each time the automated machine learning system 550 is changed or altered, its performance can be measured against the datasets included in the database 557. For example, the performance of respective models automatically generated by the automated system can be measured against some portion (e.g., all) of the different tasks or domains. That is, a new version of an automated machine learning system 550 can be used to generate one or more new machine learning models for one or more datasets/tasks/domains included in the database 557. The performance of these models can be compared to the performance of other models generated by past versions of the system or other systems. The performance of the new models versus the previous models can be used as a proxy for measuring an improvement in or otherwise understanding the performance of the automated machine learning system 550.

In such fashion, the benchmarking tools described herein can provide for consistent and comparable performance benchmarking not only for specific models, but also for a larger system that seeks to automate aspects of the machine learning process (e.g., architecture searches, etc.). Furthermore, because the database 557 can include data for many different tasks or domains, the performance of the automated machine learning system 550 can be measured and optimized across such different tasks or domains or subsets thereof (e.g., user-defined subsets).

The automated machine learning system 550 can also include or be in communication with a meta-learning system 559. The meta-learning system 559 for automated machine learning system 550 can iteratively improve the automated machine learning system 550. More particularly, the automated machine learning system 550 can itself be considered to be meta-learning system 559 in which the automated machine learning system 550 is an "outer loop" that iteratively changes various aspects (e.g., architecture, hyperparameters, etc.) of the model training or generation process (i.e., the "inner loop" executed by model trainer 561) to optimize the model training or generation process, which in turn optimizes the final outputted model. The meta-learning system 559 described herein can be yet another "outer loop" around the automated machine learning system 550. For example, as described in the paragraphs above, a benchmarking system and database 557 can store hundreds or thousands of machine learning datasets for different tasks or domains. The meta-learning system 559 for automated machine learning system 550 can track metadata for every task such that the meta-learning system 559 can apply the principles of iterative testing, learning, and improvement on the automated machine learning system 550.

Thus, the parameters or hyperparameters (e.g., system settings such as, for example, number of training iterations) of the automated machine learning system 550 can be tuned (e.g., automatically tuned according to learning-based or black box optimization approaches) over time to continuously improve performance of the automated machine learning system and/or to enable high quality initial performance for new datasets. As one example, the meta-learning system 559 for automated machine learning system 550 can predict system settings for the automated machine learning system 550 to be applied to a new dataset based on characteristics of the new dataset. For example, statistical measures for the new dataset can be evaluated. Prior datasets that have similar statistical measures can be identified. The system settings that resulted in best performance for such prior datasets can be used as the initial settings for application of the automated machine learning system to the new dataset. For example, the system settings that resulted in best performance for such prior datasets can be averaged (e.g., a weighted average).

In a further example, the meta-learning system 559 for automated machine learning system 550 can include a machine-learned model (e.g., a neural network) that is trained to predict parameter or hyperparameter (e.g., system settings) for the automated machine learning system to be applied with respect to generation of a model for a new dataset. For example, the new dataset can be provided as input to the machine-learned model and, in one example, the machine-learned model can directly predict the hyperparameter values. In another example, the machine-learned model can generate a dataset embedding for the new dataset within an embedding space that encodes latent information about datasets. In such an example, other previous datasets that have embeddings that are similar (e.g., close in distance measure) to the embedding generated for the new dataset can be identified. The system settings that resulted in best performance for such prior datasets can be used as the initial settings for application of the automated machine learning system to the new dataset. For example, the system settings that resulted in best performance for such prior datasets can be averaged (e.g., a weighted average).

In further examples, an ensemble of neural networks can be trained on a dataset of previously trained model hyper-parameters from all "related" prior searches. For example, each neural network in the ensemble can take as input a collection of tuples (e.g., model hyper-parameters, dataset properties), and output (predicted mean, predicted standard deviation) of the objective value. For example, each network can be trained to maximize the log likelihood of the true objective values of all trained models across all prior searches. In some implementations, each neural network can be trained separately from an independently sampled random initialization. At prediction time, the predictions of the neural networks can be ensembled to a single prediction. More precisely, in some examples, the ensemble distribution is a uniform mixture of Gaussian distributions, each of which is produced by a neural network. One example formula (via Bayesian model averaging) is: ensemble mean=mean of predicted means; ensemble standard deviation=mean of (predicted mean ^2+predicted standard deviation ^2)–ensemble mean ^2. The more disagreement there is among the ensemble members, the higher ensemble standard deviation will be, as desired.

The automated machine learning system 550 can include an origination pipeline 560. The origination pipeline 560 can be used to generate the models and/or deployment pipelines. The origination pipeline 560 can operate as described with reference to FIG. 2A and/or FIG. 2B.

The automated machine learning system 550 can include a model trainer 561 that trains the machine-learned models 520 and/or 540 stored at the user computing device 502 and/or the server computing system 530 using various training or learning techniques, such as, for example, backwards propagation of errors. For example, a loss function can be back propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 561 can perform a number of generalization techniques (e.g., weight decays, dropouts, etc.) to improve the generalization capability of the models being trained.

In particular, the model trainer 561 can train the machine-learned models 520 and/or 540 based on a set of training data 562. In some implementations, if the user has provided consent, the training examples can be provided by the user computing device 502. Thus, in such implementations, the model 520 provided to the user computing device 502 can be trained by the automated machine learning system 550 on user-specific data received from the user computing device 502. In some instances, this process can be referred to as personalizing the model.

The model trainer 561 includes computer logic utilized to provide desired functionality. The model trainer 561 can be implemented in hardware, firmware, and/or software controlling a general-purpose processor. For example, in some implementations, the model trainer 561 includes program files stored on a storage device, loaded into a memory and executed by one or more processors. In other implementations, the model trainer 561 includes one or more sets of computer-executable instructions that are stored in a tangible computer-readable storage medium such as RAM, hard disk, or optical or magnetic media.

The network 580 can be any type of communications network, such as a local area network (e.g., intranet), wide area network (e.g., Internet), or some combination thereof and can include any number of wired or wireless links. In general, communication over the network 580 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data, and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 5A illustrates one example computing system that can be used to implement the present disclosure. Other computing systems can be used as well. For example, in some implementations, the user computing device 502 can include the model trainer 561 and the training dataset 562. In such implementations, the models 520 can be both trained and used locally at the user computing device 502. In some of such implementations, the user computing device 502 can implement the model trainer 561 to personalize the models 520 based on user-specific data.

Figure 5B:
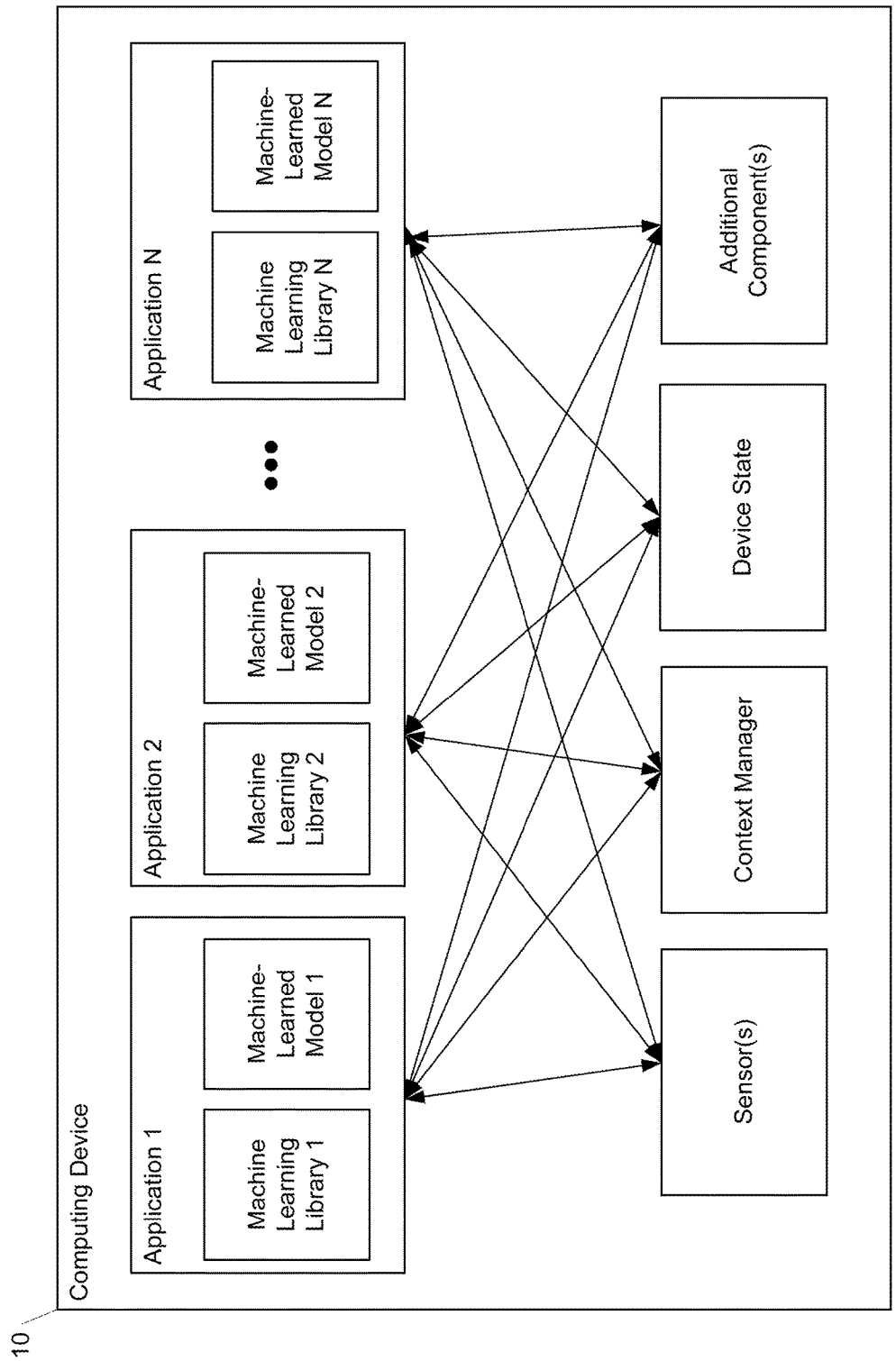
FIG. 5B depicts a block diagram of an example computing device according to example implementations of the present disclosure.

FIG. 5B depicts a block diagram of an example computing device 10 that performs according to example implementations of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 5B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 5C:
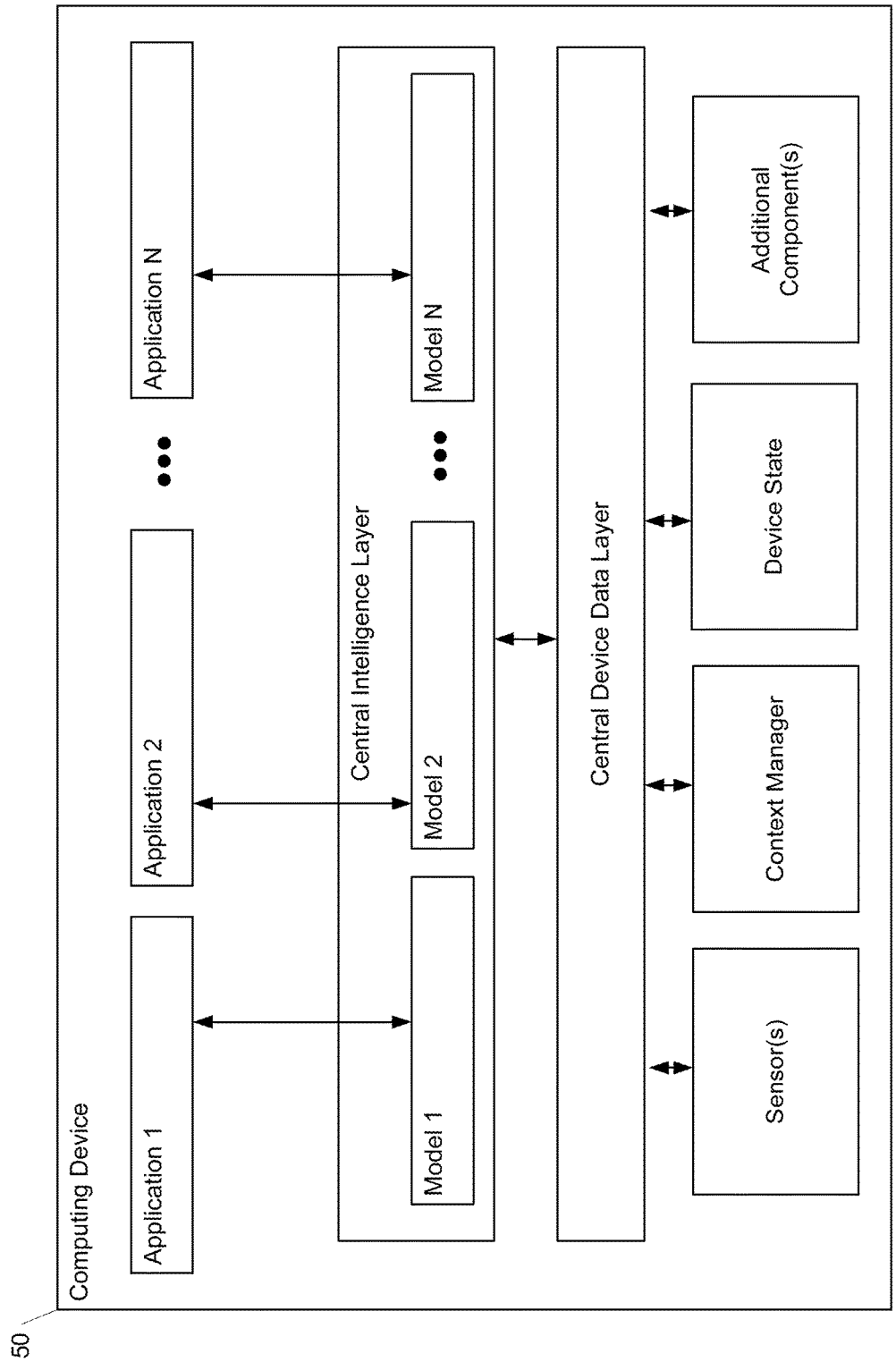
FIG. 5C depicts a block diagram of an example computing device according to example implementations of the present disclosure.

FIG. 5C depicts a block diagram of an example computing device 50 that performs according to example implementations of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 5C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 5C, the central device data layer can communicate with a number of other components of the computing device, such as, for example, one or more sensors, a context manager, a device state component, and/or additional components. In some implementations, the central device data layer can communicate with each device component using an API (e.g., a private API).

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example implementations thereof, each example is provided by way of explanation, not limitation of the disclosure. Those skilled in the art, upon attaining an understanding of the foregoing, can readily produce alterations to, variations of, and equivalents to such implementations. Accordingly, the subject disclosure does not preclude inclusion of such modifications, variations and/or additions to the present subject matter as would be readily apparent to one of ordinary skill in the art. For instance, features illustrated or described as part of one implementation can be used with another implementation to yield a still further implementation. Thus, it is intended that the present disclosure covers such alterations, variations, and equivalents.

What is claimed is:

1. A computer-implemented method for generating input data for training a machine-learning model, the method comprising:
   receiving, from a user input, signal configuration information having instructions to generate a plurality of signals from raw data, wherein the user input includes custom code to be executed using an on-the-fly operation, the custom code defining a first signal and how to generate the first signal using the raw data;
   receiving signal extraction information that has instructions to query a data store;
   accessing, using Structured Query Language (SQL) code that is generated based on the signal extraction information, the raw data from the data store;
   processing the raw data using the signal configuration information to generate the plurality of signals;
   determining that the first signal is a new signal because the first signal was not previously generated in the prior iteration of the plurality of signals;
   determining to omit a backfilling operation of the new signal because the first signal is directly generated from the raw data;
   joining, using the SQL code, the plurality of signals with a first label source to generate training data and testing data; and
   processing the training data and the testing data to generate input data, the input data being an ingestible file for a machine-learning pipeline.

2. The method of claim 1, further comprising:
   joining, using SQL code, the plurality of signals and the first label source with a second label source to generate the training data and the testing data, the first label source being a different system than the second label source.

3. The method of claim 2, wherein the first label source is an annotated data that has human-generated labels, and the second label source is a data source that has feedback information based on user interaction.

4. The method of claim 3, wherein the first label source is associated with a first sample weight, and the second label source is associated with a second sample weight, and wherein the joining of the plurality of signals and the first label source with the second label source is further based on the first sample weight and the second sample weight.

5. The method of claim 4, wherein the first sample weight is based on a confidence level associated with the first label source, and the second sample weight is based on a different confidence level associated with the second label source.

6. The method of claim 1, wherein the first signal is a base signal that was not generated in a prior iteration of the plurality of signals, the base signal being derived by processing a plurality of inputs obtained from the raw data, the method further comprising: backfilling the base signal using an on-the-fly operation, wherein the on-the-fly operation prevents a full-fledged backfill operation.

7. The method of claim 1, wherein the data store includes a first data source and a second data source, and wherein the signal extraction information includes instructions to query the first data source and the second data source, the first data source being a different type than the second data source.

8. The method of claim 7, wherein the first data source is a column in a first dataset and the second data source is a human-generated label in a second dataset.

9. The method of claim 1, wherein generating the training data and the testing data further comprising:
performing, based on a custom request, a custom-split of the training data and the testing data.

10. The method of claim 9, wherein the custom request is a date reference, and wherein the training data is associated with data prior to the date reference and the testing data is associated with data after the date reference.

11. The method of claim 9, wherein the machine-learning model is trained on non-independent and identically distributed (IID) data requiring a custom-split of the training data and the testing data.

12. The method of claim 1, further comprising:
transmitting an alert when an error occurs during the generating of the plurality of signals.

13. The method of claim 1, further comprising:
transmitting an alert when an error occurs during the generating of the training data or the testing data.

14. The method of claim 1, wherein the training data is utilized during the training of the machine-learning model, and the testing data is utilized during a validation testing of the machine-learning model.

15. The method of claim 1, wherein the plurality of signals are stored in a table pointing to a file dump containing all signals utilized by the machine-learning model, and wherein the table is configured, using a table alias generator, to point to the file dump that is current.

16. A computing system, comprising:
one or more processors; and
one or more non-transitory computer-readable media that collectively store instructions that, when executed by the one or more processors, cause the computing system to perform operations, the operations comprising:
receiving, from a user input, signal configuration information having instructions to generate the plurality of signals from raw data, wherein the user input includes custom code to be executed using an on-the-fly operation, the custom code defining a first signal and how to generate the first signal using the raw data;
receiving signal extraction information that has instructions to query a data store;
accessing, using Structured Query Language (SQL) code that is generated based on the signal extraction information, the raw data from the data store;
processing the raw data using the signal configuration information to generate the plurality of signals;
determining that the first signal is a new signal because the first signal was not previously generated in the prior iteration of the plurality of signals;
determining to omit a backfilling operation of the new signal because the first signal is directly generated from the raw data;
joining, using the SQL code, the plurality of signals with a first label source to generate training data and testing data; and
processing the training data and the testing data to generate input data, the input data being an ingestible file for a machine-learning pipeline.

17. One or more non-transitory computer-readable media that collectively store a machine-learned model, wherein the machine-learned model has been learned by performance of operations, the operations comprising:
receiving, from a user input, signal configuration information having instructions to generate the plurality of signals from raw data, wherein the user input includes custom code to be executed using an on-the-fly operation, the custom code defining a first signal and how to generate the first signal using the raw data;
receiving signal extraction information that has instructions to query a data store;
accessing, using Structured Query Language (SQL) code that is generated based on the signal extraction information, the raw data from the data store;
processing the raw data using the signal configuration information to generate the plurality of signals;
determining that the first signal is a new signal because the first signal was not previously generated in the prior iteration of the plurality of signals;
determining to omit a backfilling operation of the new signal because the first signal is directly generated from the raw data;
joining, using the SQL code, the plurality of signals with a first label source to generate training data and testing data; and
processing the training data and the testing data to generate input data, the input data being an ingestible file for a machine-learning pipeline.

* * * * *